US011251115B1

(12) United States Patent
Yan et al.

(10) Patent No.: US 11,251,115 B1
(45) Date of Patent: Feb. 15, 2022

(54) REDISTRIBUTION STRUCTURE AND FORMING METHOD THEREOF

(71) Applicant: Industrial Technology Research Institute, Hsinchu (TW)

(72) Inventors: Shao-An Yan, New Taipei (TW); Chieh-Wei Feng, Taoyuan (TW); Tzu-Yang Ting, Taipei (TW); Tzu-Hao Yu, Yilan County (TW); Chien-Hsun Chu, Kaohsiung (TW); Jui-Wen Yang, New Taipei (TW); Hsin-Cheng Lai, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/144,144

(22) Filed: Jan. 8, 2021

(30) Foreign Application Priority Data

Sep. 18, 2020 (TW) .................................. 109132250

(51) Int. Cl.
*H01L 23/498* (2006.01)
*H01L 21/48* (2006.01)
*G06F 30/3308* (2020.01)
*G06F 119/18* (2020.01)

(52) U.S. Cl.
CPC .... *H01L 23/49838* (2013.01); *G06F 30/3308* (2020.01); *H01L 21/481* (2013.01); *H01L 21/4846* (2013.01); *G06F 2119/18* (2020.01)

(58) Field of Classification Search
CPC ............. H01L 23/49838; H01L 21/481; H01L 21/4846
USPC ....................................................... 174/250
See application file for complete search history.

(56) References Cited

U.S. PATENT DOCUMENTS

| 5,981,384 A | 11/1999 | Juengling |
| 6,961,915 B2 | 11/2005 | Loh et al. |
| 2006/0118960 A1* | 6/2006 | Landis ................. H01L 23/522 |
| | | 257/758 |

(Continued)

FOREIGN PATENT DOCUMENTS

| CN | 1099696 | 1/2003 |
| TW | 338840 | 8/1998 |
| TW | 201739008 | 11/2017 |

OTHER PUBLICATIONS

"Office Action of Taiwan Counterpart Application", dated Apr. 6, 2021, pp. 1-10.

*Primary Examiner* — Sherman Ng
(74) *Attorney, Agent, or Firm* — JCIPRNET

(57) ABSTRACT

A redistribution structure including a first redistribution layer is provided. The first redistribution layer includes a dielectric layer; at least one conductive structure located in the dielectric layer, wherein the at least one conductive structure has a width L; and at least one dummy structure located adjacent to the at least one conductive structure and located in the dielectric layer, and the at least one dummy structure has a width D, wherein there is a gap width S between the at least one dummy structure and the at least one conductive structure, and a degree of planarization DOP of the first redistribution layer is greater than or equal to 95%, wherein DOP=[1−(h/T)]*100%, and h refers to a difference between a highest height and a lowest height of a top surface of the dielectric layer; and T refers to a thickness of the at least one conductive structure.

18 Claims, 23 Drawing Sheets

(56) References Cited

U.S. PATENT DOCUMENTS

| | | | |
|---|---|---|---|
| 2011/0248404 A1* | 10/2011 | Chiu | H01L 23/522 257/773 |
| 2017/0250160 A1* | 8/2017 | Wu | H01L 25/50 |
| 2018/0012843 A1* | 1/2018 | Chen | H01L 23/5386 |
| 2018/0294233 A1* | 10/2018 | Yoon | H01L 21/4853 |
| 2020/0098707 A1* | 3/2020 | Chen | H01L 23/53295 |

* cited by examiner

REDISTRIBUTION STRUCTURE AND FORMING METHOD THEREOF

CROSS-REFERENCE TO RELATED APPLICATION

This application claims the priority benefit of Taiwan application serial no. 109132250, filed on Sep. 18, 2020. The entirety of the above-mentioned patent application is hereby incorporated by reference herein.

TECHNICAL FIELD

The disclosure relates to a plurality of packages and a manufacturing method thereof, and relates to a plurality of redistribution structures and a forming method thereof.

BACKGROUND

The redistribution layer (RDL) is a key part of packaging. However, after a metal trace of the redistribution layer is formed, a dielectric layer coated on the metal trace causes the surface of the dielectric layer to fluctuate (topography) due to the pattern of the metal trace, causing the pattern of the upper metal trace thereof to fail in the process and causing electrical loss of the upper metal trace.

SUMMARY

An embodiment of the disclosure provides a redistribution layer that may improve the degree of planarization of a dielectric layer after coating, and may improve the process yield of an upper metal trace and reduce the electrical loss of the upper metal trace.

An embodiment of the disclosure provides a redistribution structure, including: a first redistribution layer. The first redistribution layer includes a dielectric layer; at least one conductive structure located in the dielectric layer, wherein the at least one conductive structure has a width L; and at least one dummy structure located adjacent to the at least one conductive structure and located in the dielectric layer, and the at least one dummy structure has a width D, wherein there is a gap width S between the at least one dummy structure and the at least one conductive structure, and a degree of planarization DOP of the first redistribution layer is greater than or equal to 95%, wherein DOP=[1−(h/T)]*100%, and h refers to a difference between a highest height and a lowest height of a top surface of the dielectric layer; and T refers to a thickness of the at least one conductive structure.

An embodiment of the disclosure also provides a forming method of a redistribution structure, including forming a first redistribution layer. Forming the first redistribution layer includes forming at least one conductive structure; forming at least one dummy structure adjacent to the at least one conductive structure according to a thickness T and a width L of the at least one conductive structure; and coating a dielectric layer between and on the at least one conductive structure and the at least one dummy structure, and by forming the at least one dummy structure, the degree of planarization DOP of the first redistribution layer is greater than or equal to 95%, wherein DOP=[1−(h/T)]*100%, and h refers to a difference between a highest height and a lowest height of a top surface of the dielectric layer; and T refers to a thickness of the at least one conductive structure.

Based on the above, in an embodiment of the disclosure, a dummy structure is added around the conductive structure of the redistribution layer to improve the degree of planarization of the dielectric layer after coating, and improve the process yield of the upper conductive structure and reduce the electrical loss of the upper conductive structure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The range mentioned in the present specification includes its endpoints. For example, "1/2 to 12/1" means between 1/2 and 12/1, including both endpoints of 1/2 and 12/1.

Figure 1A:
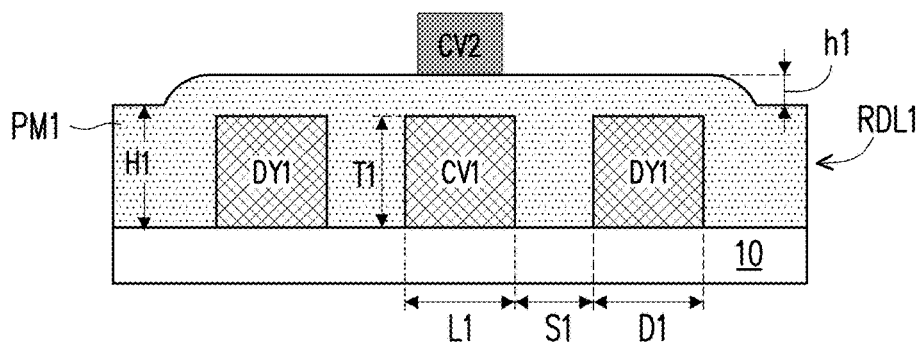
FIG. 1A to FIG. 1C are respectively cross-sectional views of a redistribution structure according to an embodiment of the disclosure.

Referring to FIGS. 1A, 2A, 3A, 4A, and 5A, an embodiment of the disclosure provides a redistribution layer RDL1. The cross-section of line I-I' of FIGS. 2A, 3A, 4A, and 5A is shown in FIG. 1A. The redistribution layer RDL1 is located on a substrate 10, and a conductive structure CV2 above the redistribution layer RDL1 is a key pattern. The key pattern is, for example, a high-frequency signal line. The substrate 10 is, for example, a carrier board. The redistribution layer RDL1 includes at least one conductive structure CV1, at least one dummy structure DY1, and a dielectric layer PM1. In the embodiment shown in FIG. 1A, the redistribution layer RDL1 includes one conductive structure CV1, a plurality of dummy structures DY1, and a dielectric layer PM1, but the disclosure is not limited thereto. In another embodiment, the redistribution layer RDL1 includes a plurality of conductive structures CV1, a plurality of dummy structures DY1, and a dielectric layer PM1. In yet another embodiment, the redistribution layer RDL1 includes a plurality of conductive structures CV1, one dummy structure DY1, and a dielectric layer PM1.

The conductive structures CV1 may also be called conductive features, which are circuits with actual functions. The conductive structures CV1 may include a trace located on the substrate 10. The conductive structures CV1 may be electrically connected to a subsequently formed component or to another conductive structure CV1. The dummy structures DY1 are disposed between the plurality of conductive structures CV1. The dummy structures DY1 are floating and electrically insulated from the conductive structures CV1. The conductive structures CV1 have a width L1. The width L1 is, for example, a critical dimension of the conductive structures CV1. The conductive structures CV1 include copper or copper-aluminum alloy.

The dummy structures DY1 are conductive materials, and therefore may also be called dummy conductive structures. The material of the dummy structures DY1 may be the same as or different from the material of the conductive structures CV1. The dummy structures DY1 may be formed with the conductive structures CV1 simultaneously or separately. The dummy structures DY1 include copper or copper-aluminum alloy. The dummy structures DY1 have a width D1. The width D1 of the dummy structures DY1 is, for example, 1/10 to 1 of the width L1 of the conductive structures CV1. There is a gap width S1 between the dummy structures DY1 and the conductive structures CV1 and between the dummy structures DY1. The dielectric layer PM1 may be formed after the conductive structures CV1 and the dummy structures DY1 are formed. The dielectric layer PM1 is disposed between the conductive structures CV1 and the dummy structures DY1 and on the surfaces thereof. The dielectric layer PM1 includes a polymer. In some embodiments, the higher the molecular weight and viscosity coefficient of the dielectric layer PM1, the lower the degree of planarization of the dielectric layer PM1. Therefore, it is also possible to select a suitable molecular weight and viscosity coefficient of the dielectric layer PM1 as the dielectric layer PM1. The dielectric layer PM1 is, for example, photosensitive polyimide (PSPI), polyimide, polybenzoxazole (PBO), benzocyclobutene (BCB), and the like. The dielectric layer PM1 is a coating layer without a planarization process (for example, a chemical mechanical polishing process). The forming method of the dielectric layer PM1 is, for example, a spin coating method. After the coating layer is formed, a curing process may be performed to form the dielectric layer PM1. The ratio of a thickness T1 of the conductive structures CV1 to a thickness H1 of the dielectric layer PM1 is, for example, 1:1.1 to 1:1.6. The thickness H1 of the dielectric layer PM1 refers to the distance from the lowest height of the bottom surface of the dielectric layer PM1 to the lowest height of the top surface of the dielectric layer PM1.

In some embodiments, the ratio L1/S1 of the width L1 of the conductive structures CV1 to the gap width S1 is 1/2 to 12/1. In some other embodiments, the ratio L1/S1 of the width L1 of the conductive structures CV1 to the gap width S1 is 1/2 to 10/1. The ratio L1/D1 of the width L1 of the conductive structures CV1 to the width D1 of the dummy structures DY1 is, for example, between 1 and 10. By controlling the thickness T1 and the ratios L1/S1 and L1/D1 of the conductive structures CV1 and the dummy structures DY1, the degree of planarization DOP1 of the redistribution layer RDL1 of the disclosure may be greater than or equal to 95%. The definition of the degree of planarization DOP1 is as follows:

$$DOP1=[1-(h1/T1)]*100\%$$

h1 refers to the difference between the highest height and the lowest height of the top surface of the dielectric layer PM1; and T1 is the thickness of the conductive structures CV1.

In the manufacturing process, after the conductive structures CV1 and the dummy structures DY1 of the redistribution layer RDL1 are formed, the thickness T1 of the conductive structures CV1 may be measured. Then, the dielectric layer PM1 is formed. Then, the dielectric layer PM1 may be measured to obtain H1 and the height difference h1. According to the resulting thickness T1 and height difference h1, the degree of planarization DOP1 may be calculated. When h1 is larger, the degree of planarization DOP1 is smaller, meaning that the top surface of the redistribution layer RDL1 is more uneven and insertion loss is larger. When h1 is smaller, the degree of planarization DOP1 is larger, meaning that the top surface of the redistribution layer RDL1 is more even and insertion loss is smaller. When DOP1 is greater than or equal to 95%, the electrical loss may be reduced to within design requirements.

In addition, as the width L1 of the conductive structures CV1 is larger, the interval range of the ratio L1/D1 at which the degree of planarization DOP1 may reach 95% is larger. As the width L1 of the conductive structures CV1 is smaller, the interval range of the ratio L1/D1 at which the degree of planarization DOP1 may reach 95% is smaller. For example, for conductive structures with a thickness of 1 to 4 microns and a width L of greater than 100 microns, controlling L1/D1 within the interval range of 1/1 to 10/1 may make the degree of planarization DOP1 reach 95%; and for conductive structures with the same thickness of 1 to 4 microns but a width L of 10 to 20 microns, L1/D1 needs to be controlled at 1 to 2/1 to achieve a degree of planarization DOP1 of 95%.

When the width L1 of the conductive structures CV1 is smaller and the ratio L1/S1 reaches a smaller value, the degree of planarization DOP1 may reach 95%. When the width L1 of the conductive structures CV1 is larger, the ratio L1/S1 is larger so that the degree of planarization DOP1 may reach 95%. For example, for conductive structures with a thickness of 4 to 8 microns and a width L between 10 and 20 microns, a ratio L1/S1 greater than or equal to 2 may make the degree of planarization DOP reach 95%; and for the same conductive structures with a thickness of 4 to 8 microns and a width L greater than 100 microns, the ratio L/S needs to be greater than or equal to 10 to achieve a degree of planarization DOP of 95%.

In some embodiments, the dummy structures DY1 are disposed around each of the conductive structures CV1. The size and density of the dummy structures DY1 around the conductive structures CV1 in different regions may be the same or different. For example, the size of the dummy structures DY1 disposed around the conductive structures CV1 in a critical area (large degree of planarization DOP) is smaller than the size of the small dummy structures DY1 disposed around the conductive structures CV1 in a non-critical area (small degree of planarization DOP), and/or the density of the dummy structures DY1 disposed around the conductive structures CV1 in a critical area (large degree of planarization DOP) is larger than the density of the small dummy structures DY1 disposed around the conductive structures CV1 in a non-critical area (small degree of planarization DOP). In other embodiments, the dummy structures DY1 are disposed around a portion of the conductive structures CV1, and the dummy structures are not disposed around another portion of the conductive structures CV1. For example, the dummy structures DY1 may be disposed around the conductive structures CV1 in a critical area, and the dummy structures DY1 do not need to be disposed around the conductive structures CV1 in a non-critical area. That is, the degree of planarization DOP1 of the non-critical area may be less than or equal to the degree of planarization DOP1 of the critical area. The critical area is, for example, an area that has an influence (for example, electrical loss) on the conductive structure CV2. The non-critical area is, for example, an area that does not have an influence on the conductive structure CV2.

The cross-section of line I-I' of FIGS. 2A, 3A, 4A, and 5A is shown in FIG. 1A. Referring to FIGS. 1A, 2A, 3A, 4A, and 5A, the shape of the dummy structures DY1 includes square, circular, polygonal, strip, and combinations thereof. The dummy structures DY1 in the redistribution layer RDL1 may be dummy structures DY1 having a single shape or dummy structures DY1 having a plurality of shapes. In addition, the size and length and the like of the dummy structures DY1 may be the same or different. In FIGS. 2A, 3A, 4A, and 5A, the dummy structures DY1 are arranged in an array or parallel to each other, and the dummy structures DY1 have a single shape and have the shape of square, circular, polygonal, and strip, respectively.

The width D1 of the dummy structures DY1 may be the same or different. In some embodiments, the redistribution layer RDL1 has dummy structures DY1 with a single width D1. In some other embodiments, the redistribution layer RDL1 has dummy structures DY1 with 2 or more widths D1. For example, the width D1 of the dummy structures DY1 of the redistribution layer RDL1 where the degree of planarization requirement is lower may be greater than the width D1 of the dummy structures DY1 of the redistribution layer RDL1 where the degree of planarization requirement is higher. The width D1 of the dummy structures DY1 is, for example, less than 40 microns, for example, between 10 microns and 40 microns, or less than 10 microns.

The dummy structures DY1 may be disposed between the conductive structures CV1 with a fixed gap width S1 or various gap widths S1. In some embodiments, there is a single gap width S1 between the dummy structures DY1 and the conductive structures CV1 of the redistribution layer RDL1. In some other embodiments, there is 2 or more gap widths S1 between the dummy structures DY1 and the conductive structures CV1 of the redistribution layer RDL1.

In an embodiment in which the redistribution layer RDL1 has dummy structures DY1 with a single width D1, the dummy structures DY1 are disposed with a fixed gap width S1. As a result, the width D1 of the dummy structures DY1 is smaller, more dummy structures DY1 may be disposed, the distribution of the dummy structures is more even, the degree of planarization DOP1 is greater, the height fluctuation of the surface of the redistribution layer RDL1 is smaller, and the the surface is smoother. Conversely, the greater the width D1 of the dummy structures DY1, the smaller the degree of planarization DOP1, the greater the height fluctuation of the redistribution layer RDL1, and the more uneven the surface.

In an embodiment in which the redistribution layer RDL1 has dummy structures DY1 with a single width D1, the dummy structures DY1 are disposed with a fixed gap width S1. As a result, the gap width S1 is smaller, more dummy structures DY1 may be disposed, the distribution of the dummy structures is more even, the height fluctuation of the coated dielectric layer PM1 is smaller, and the degree of planarization DOP1 is greater. Conversely, the greater the gap width S1, the greater the height fluctuation of the coated dielectric layer PM1, and the smaller the degree of planarization DOP1. The gap width S1 between the dummy structures DY1 and the conductive structures CV1 is, for example, less than 80 microns, for example, between 5 microns and 40 microns. When the gap width S1 is greater than 40 microns, the improvement of the degree of planarization of the redistribution layer RDL1 is very limited.

Via the configuration of the dummy structures DY1 and the control of the ratio L1/S1 and ratio L1/D1, the degree of planarization DOP1 of the redistribution layer RDL1 may be increased from 60% to more than 75%, for example, 75% to 95%, or even higher.

An embodiment of the disclosure may be used in a redistribution structure formed by a plurality of redistribution layers. In the redistribution structure, dummy structures may be disposed in one or a plurality of redistribution layers, or dummy structures may be disposed in each redistribution layer, as shown in FIGS. 1B and 1C.

Figure 1B:
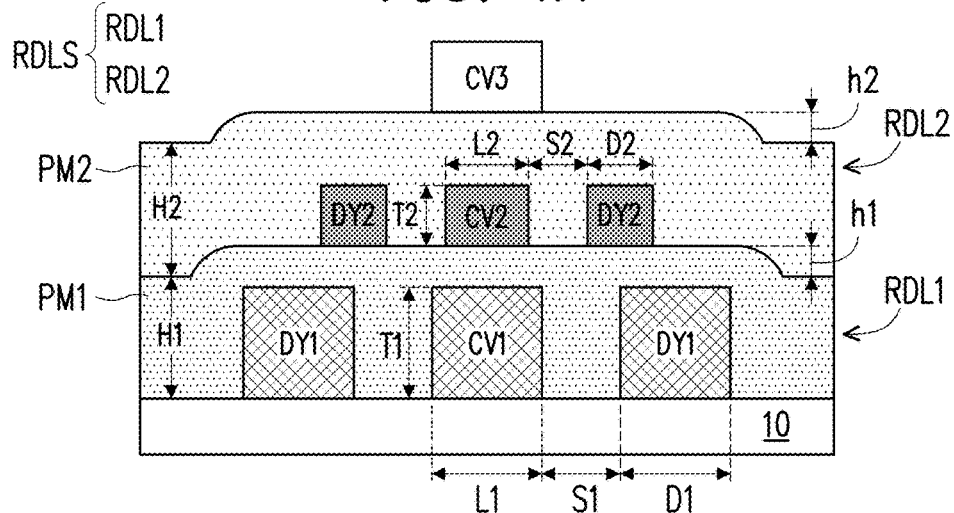
Figure 1C:
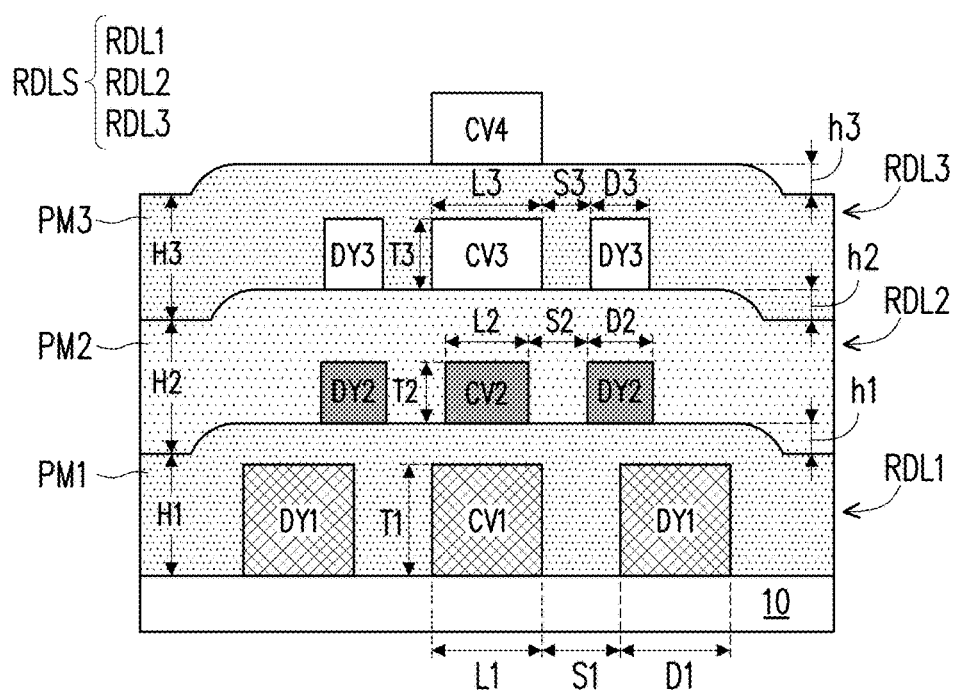
Figure 2A:
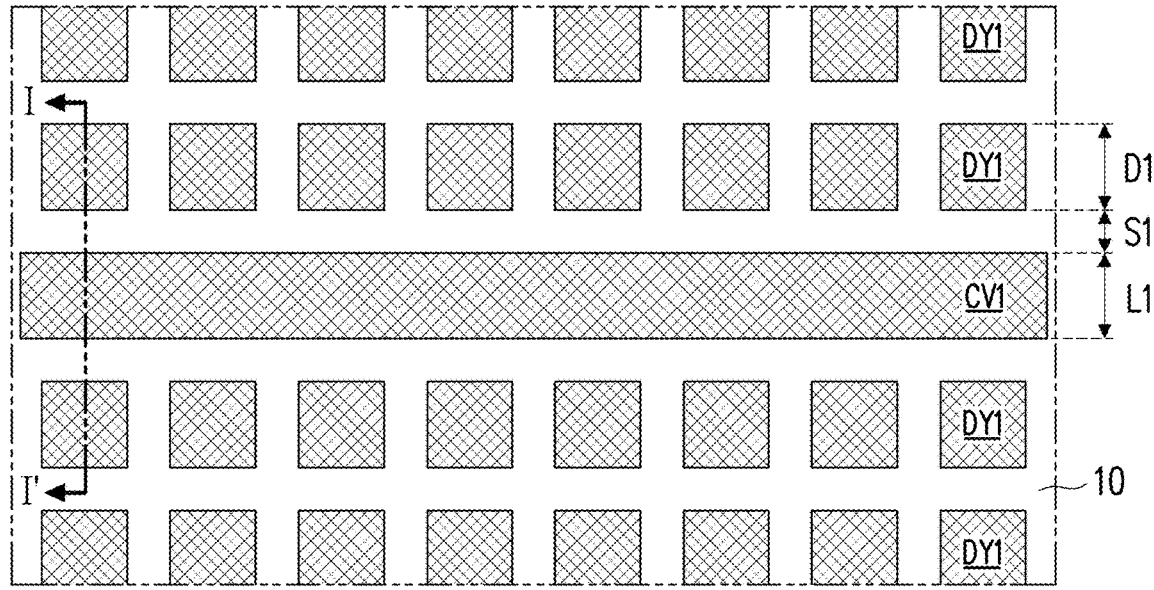
FIG. 2A to FIG. 2C, FIG. 3A to FIG. 3C, FIG. 4A to FIG. 4C, and FIG. 5A to FIG. 5C are respectively top views of a plurality of redistribution structures according to embodiments of the disclosure.
Figure 3A:
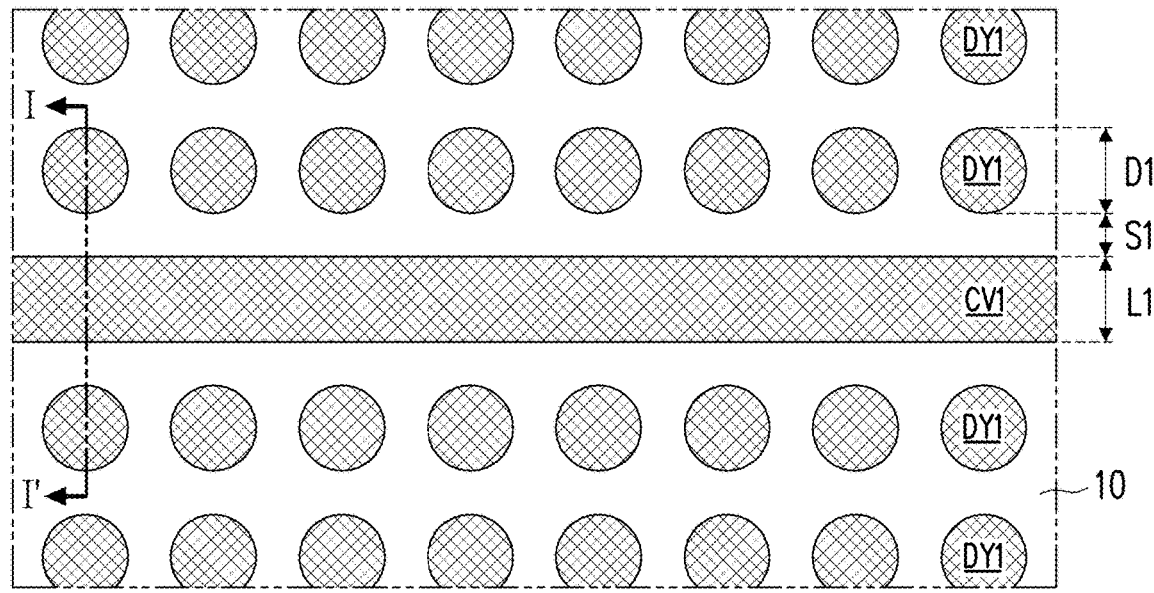
Figure 2B:
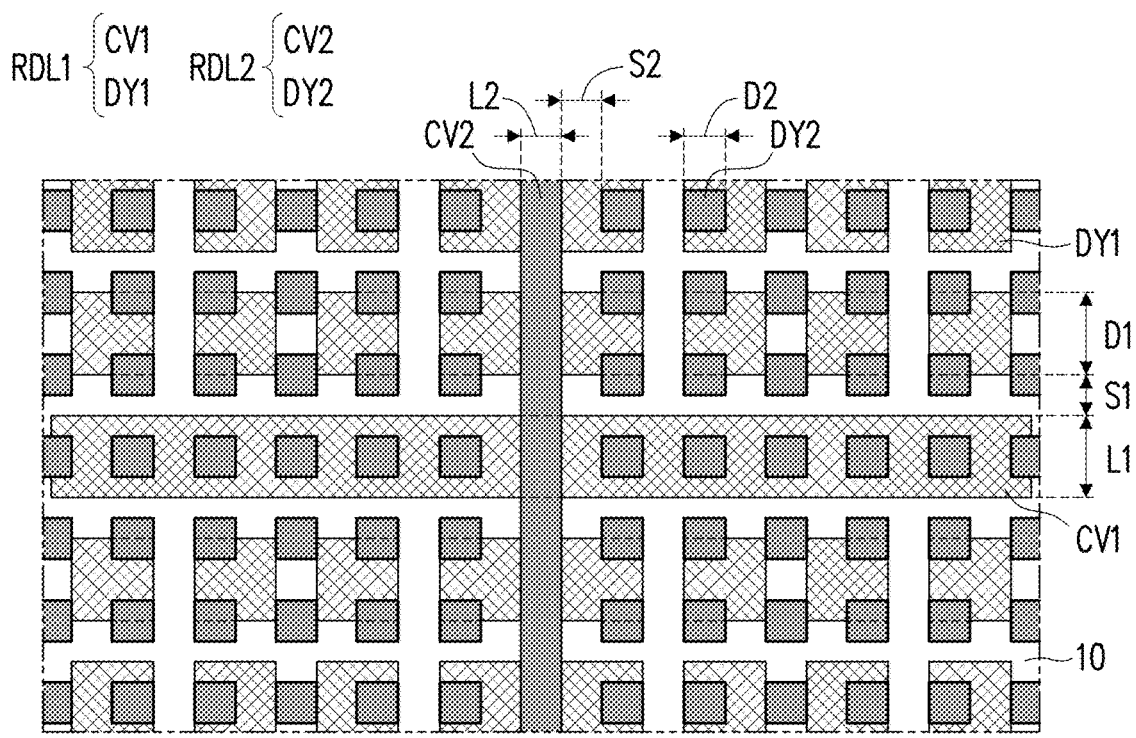
Figure 3B:
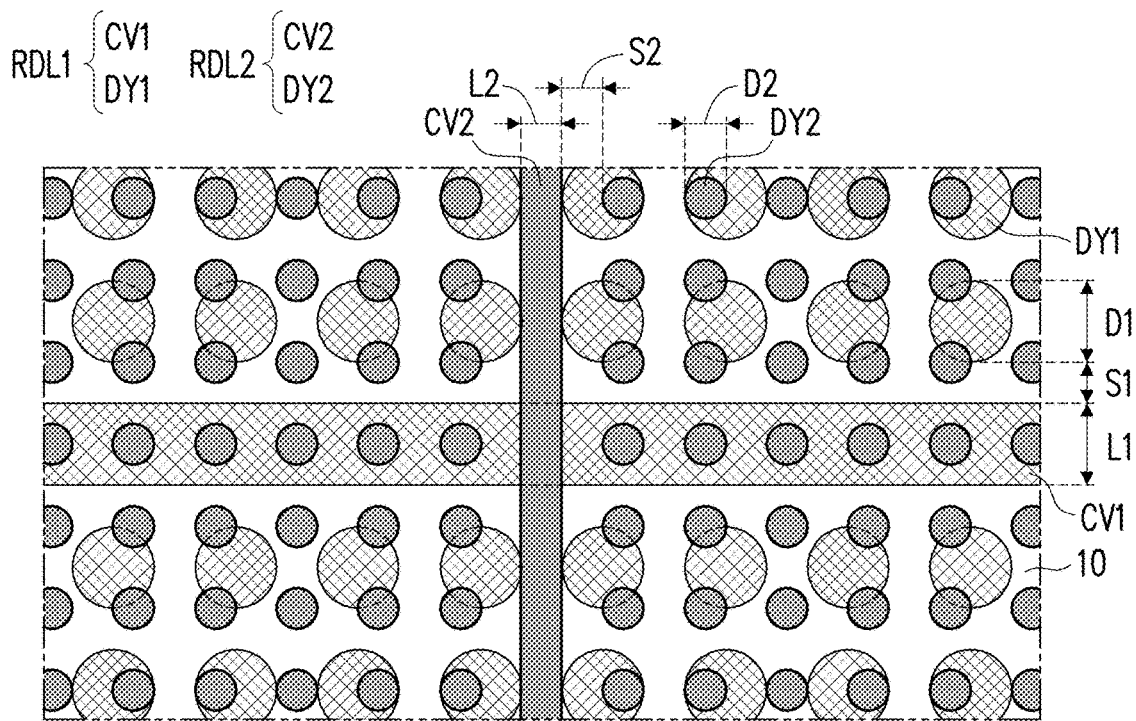
Figure 2C:
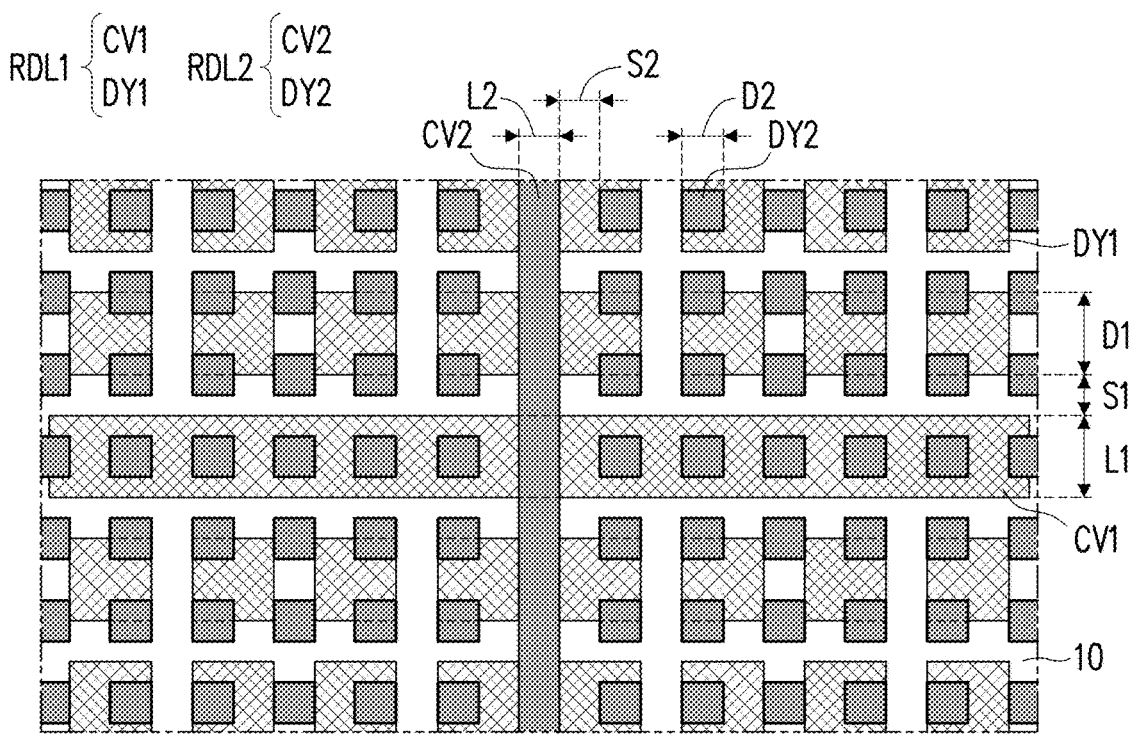
Figure 3C:
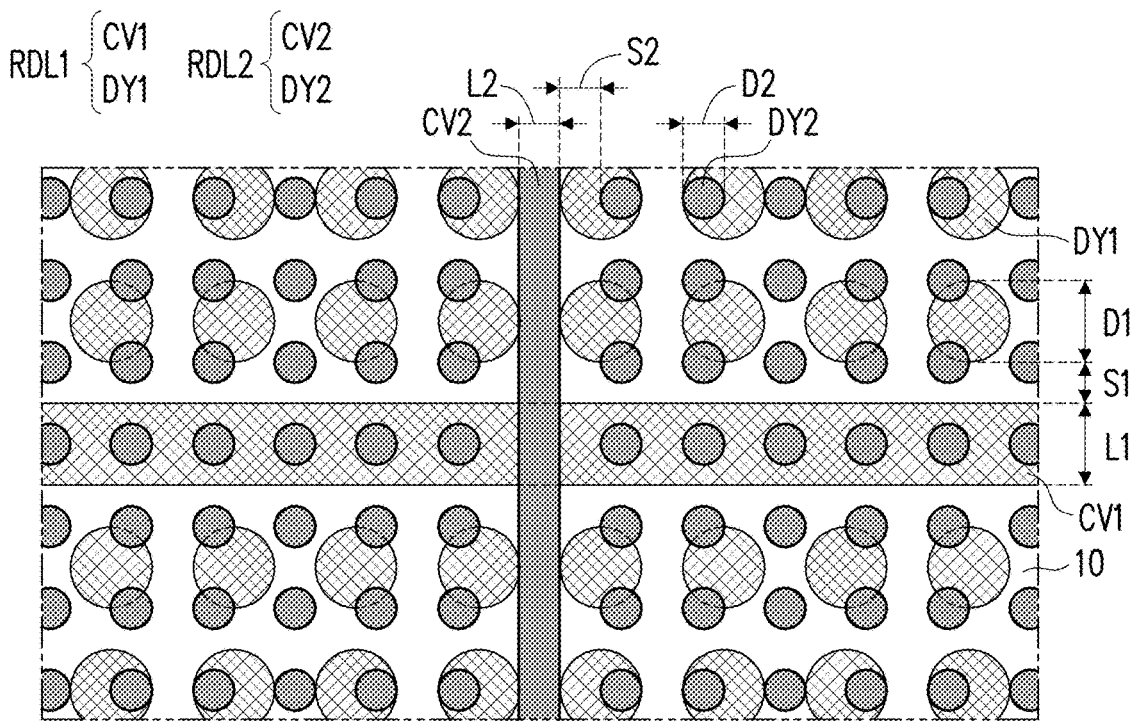
Figure 4A:
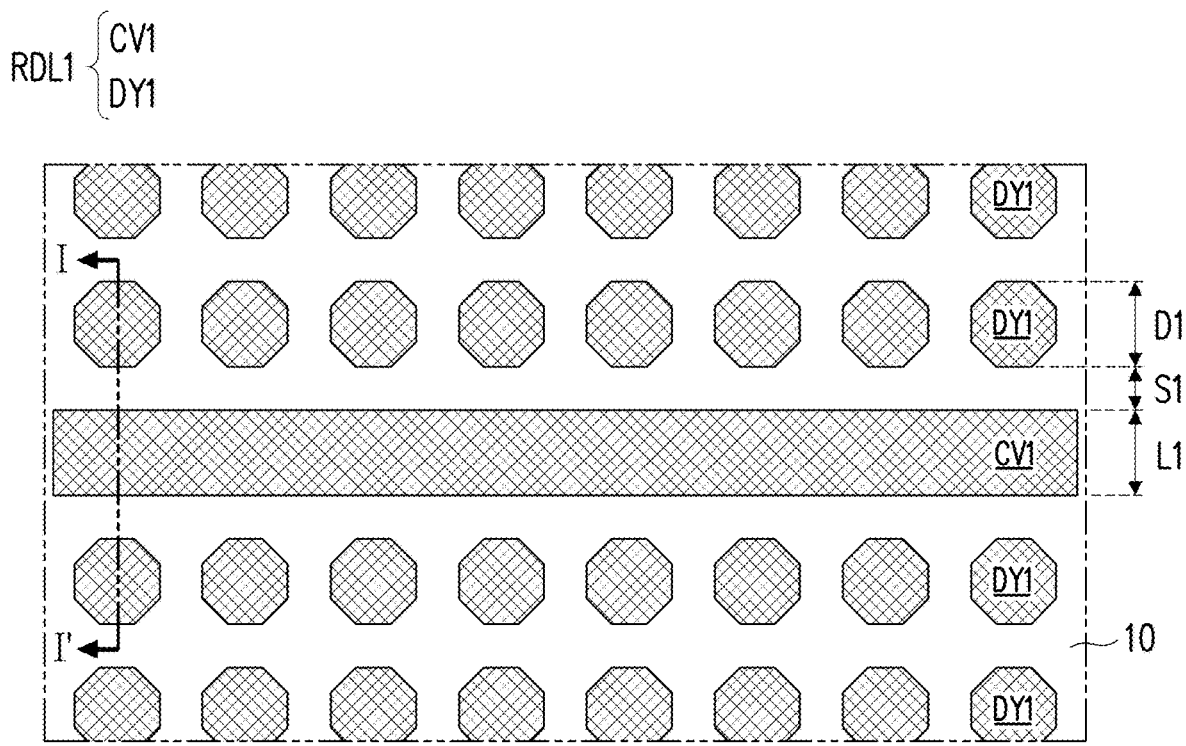
Figure 5A:
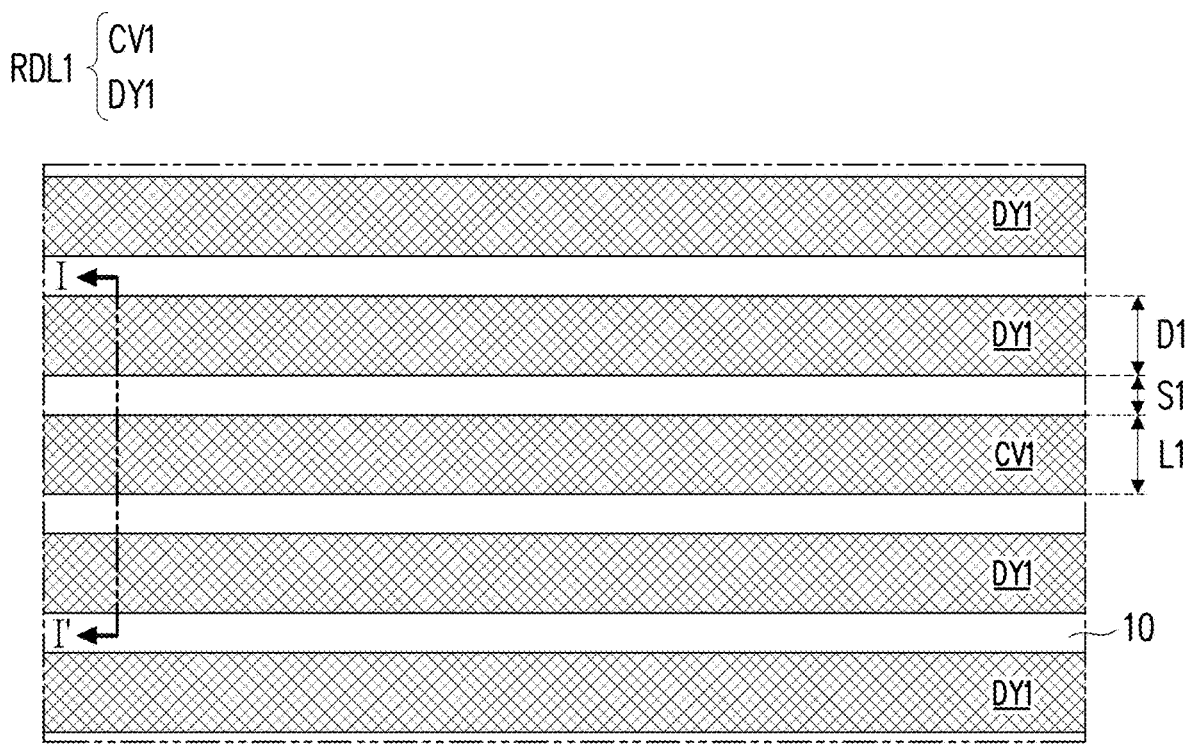
Figure 4B:
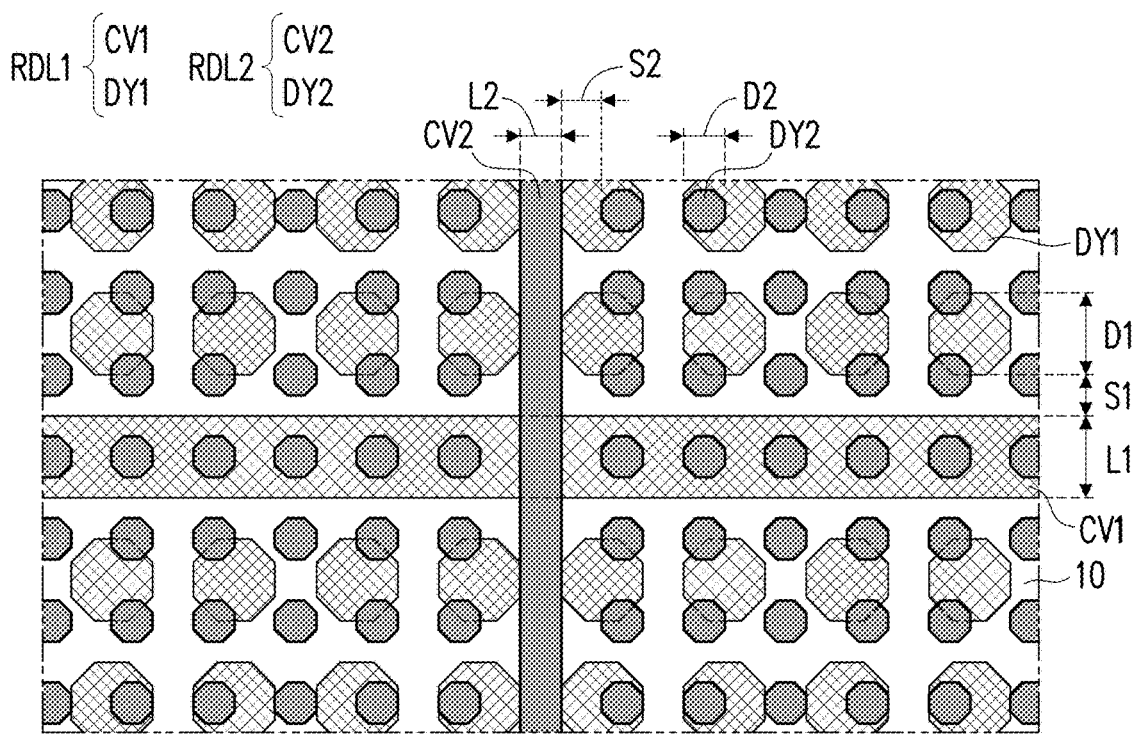
Figure 5B:
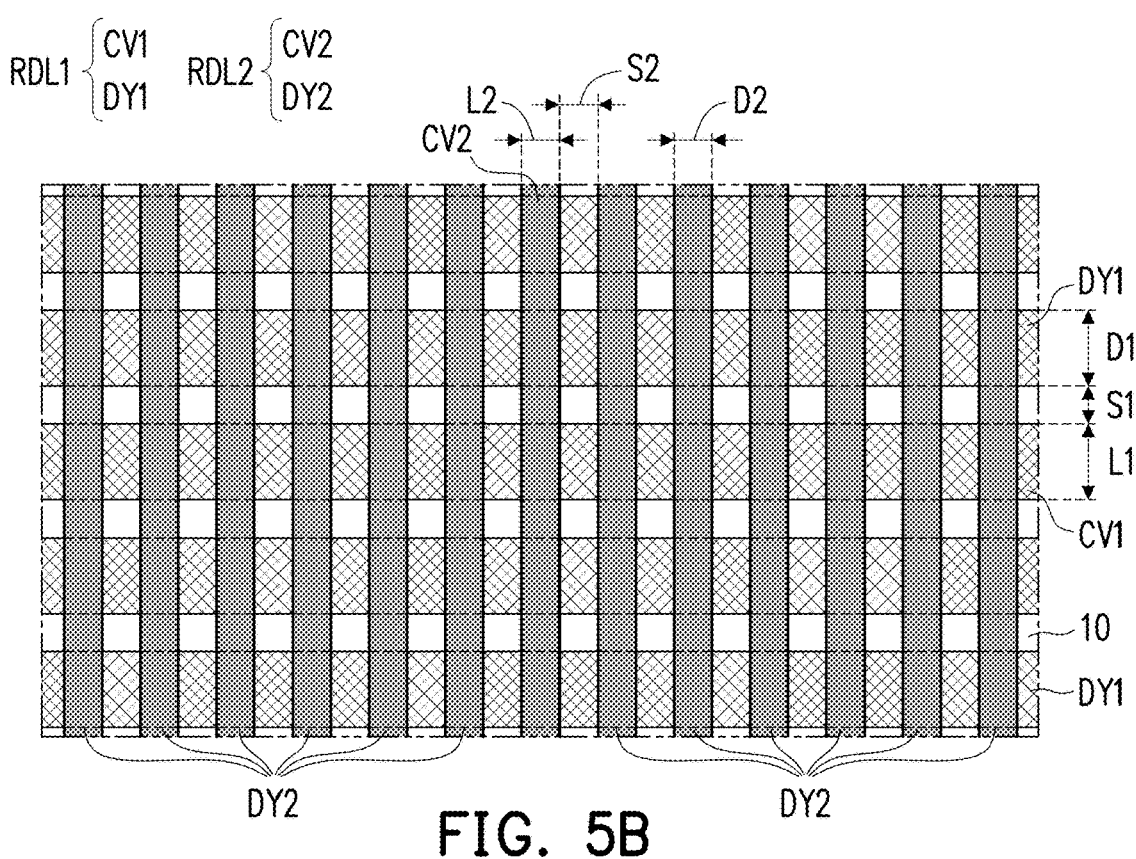
Figure 4C:
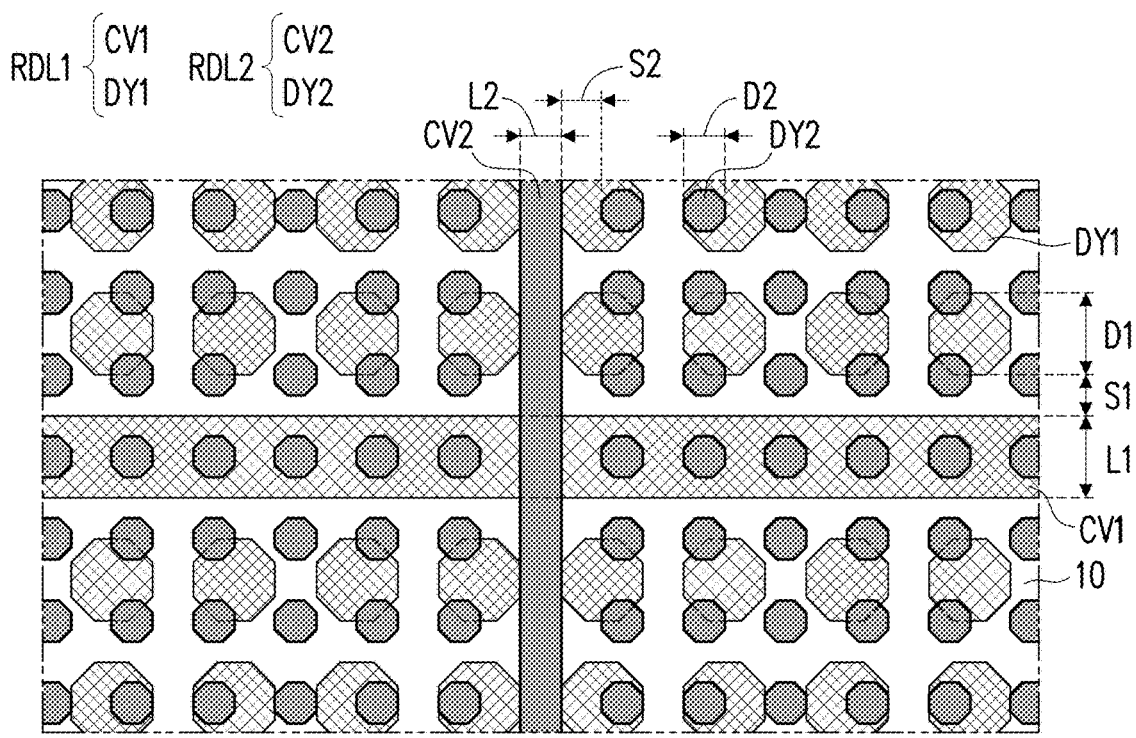
Figure 5C:
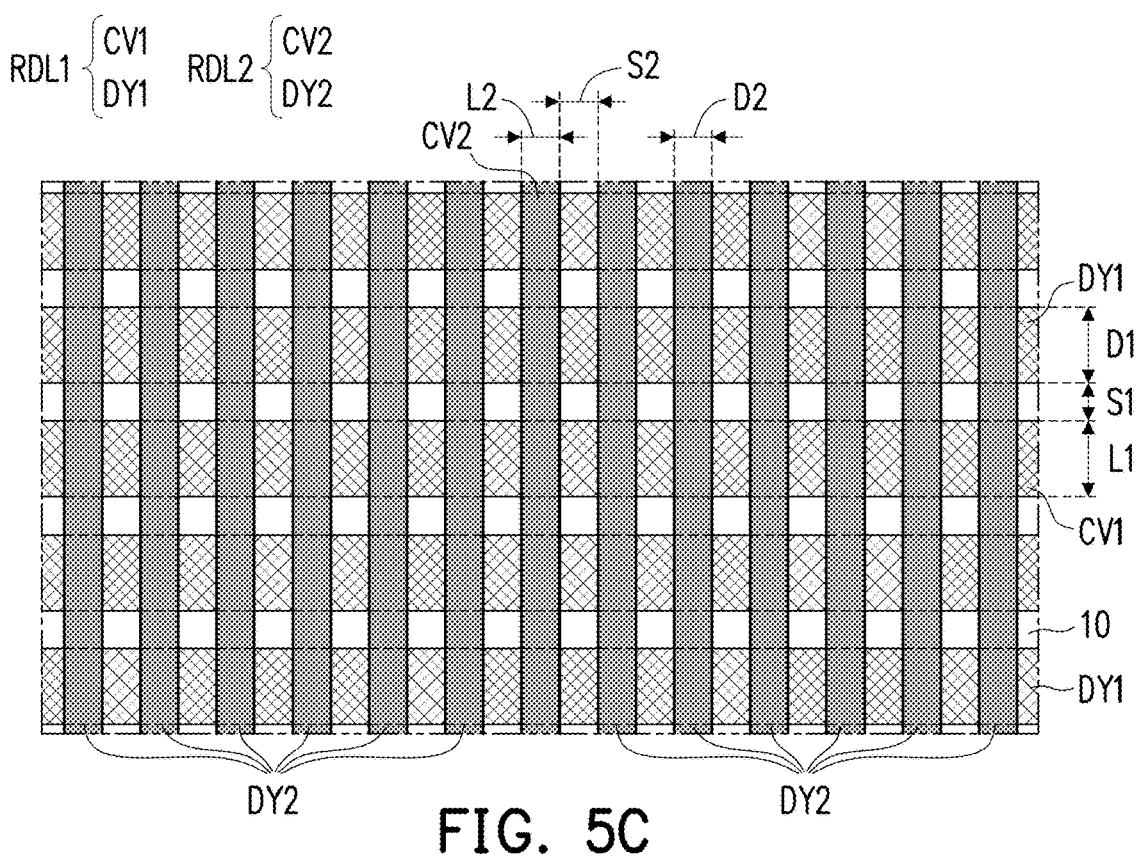

Referring to FIG. 1B, a redistribution structure RDLS is located on the substrate 10. The redistribution structure RDLS includes a redistribution layer RDL1 and a redistribution layer RDL2. A conductive structure CV3 above the redistribution layer RDL2 is a key pattern. The key pattern is, for example, a high-frequency signal line.

The degree of planarization DOP1 of the redistribution layer RDL1 may be less than or equal to 95%, for example, 65% or less. In some examples, the structure and forming method of the redistribution layer RDL1 may be, for example, the redistribution layer RDL1 having at least one conductive structure CV1, at least one dummy structure DY1, and a dielectric layer PM1 as described in the above embodiments. In some other examples, the structure of the redistribution layer RDL1 may include the conductive structures CV1, and not include the dummy structures DY1. In the present embodiment, redistribution layer RDL1 has the conductive structures CV1, the dummy structures DY1, and the dielectric layer PM1.

After the redistribution layer RDL1 is formed, no additional planarization process is performed on the dielectric layer PM1, and the redistribution layer RDL2 is directly formed on the dielectric layer PM1. The structure of the redistribution layer RDL2 may be similar to or different from that of the redistribution layer RDL1.

The redistribution layer RDL2 includes at least one conductive structure CV2, at least one dummy structure DY2, and a dielectric layer PM2. In the embodiment shown in FIG. 1B, the redistribution layer RDL2 includes one conductive structure CV2, a plurality of dummy structures DY2, and a dielectric layer PM2, but the disclosure is not limited thereto. In another embodiment, the redistribution layer RDL2 includes a plurality of conductive structures CV2, a plurality of dummy structures DY2, and a dielectric layer PM2. In yet another embodiment, the redistribution layer RDL2 includes a plurality of conductive structures CV2, one dummy structure DY2, and a dielectric layer PM2.

Figure 7:
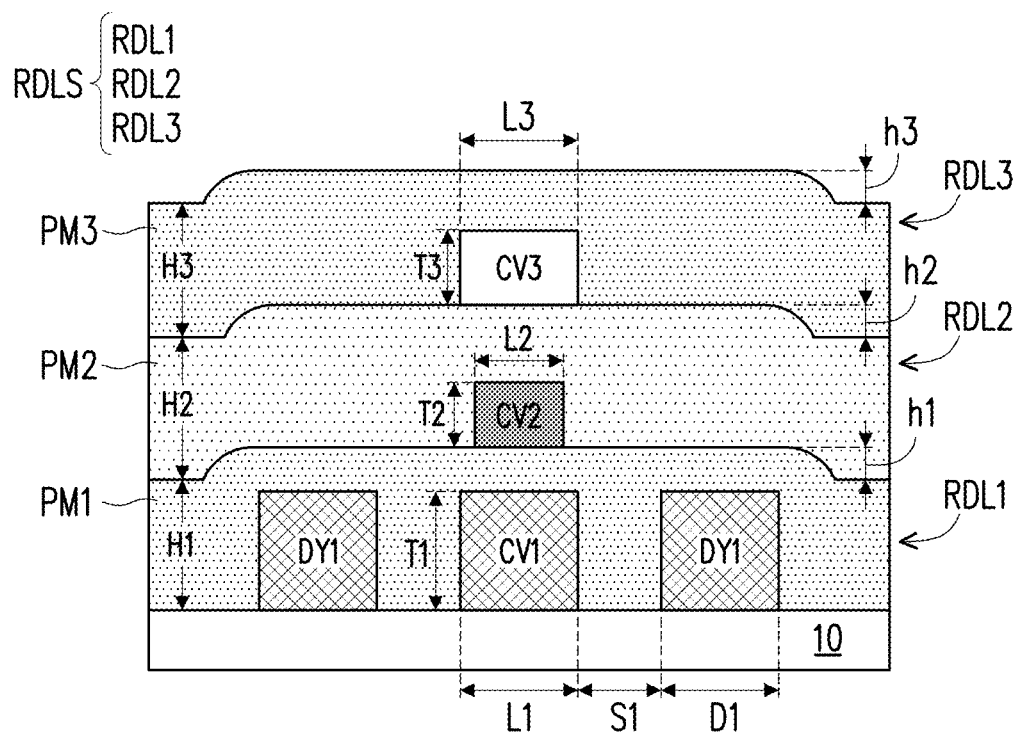

The conductive structures CV2 may include a trace located on the dielectric layer PM1. The conductive structures CV2 further include a through hole (not shown) penetrating the dielectric layer PM1 and connected to the trace of the conductive structures CV2 and the trace of the conductive structures CV1. The dummy structures DY2 are disposed around the conductive structures CV2. The dummy structures DY2 are floating, electrically insulated from the trace in the conductive structures CV2, and electrically insulated from the trace of the conductive structures CV1 or subsequent components. The conductive structures CV2 have a width L2. The width L2 is, for example, a critical dimension of the conductive structures CV2. The dummy structures DY2 have a width D2. There is a gap width S2 between the dummy structures DY2 and the conductive structures CV2 and between the dummy structures DY2. In other embodiments, the redistribution layer RDL2 may also not include a plurality of dummy structures DY2, as shown in FIG. 7, which is described in detail later.

The dielectric layer PM2 is disposed between the conductive structures CV2 and the dummy structures DY2 and on the surfaces thereof. The dielectric layer PM2 includes a polymer, for example, photosensitive polyimide (PSPI), polyimide, polybenzoxazole (PBO), benzocyclobutene (BCB), and the like. The dielectric layer PM2 is a coating layer without a planarization process (for example, a chemical mechanical polishing process). The forming method of the dielectric layer PM2 is, for example, a spin coating method. The ratio of a thickness T2 of the conductive structures CV2 to a thickness H2 of the dielectric layer PM2 is, for example, 1:1.1 to 1:1.6. The thickness H2 of the dielectric layer PM2 refers to the distance from the lowest height of the bottom surface of the dielectric layer PM2 to the lowest height of the top surface of the dielectric layer PM2.

A degree of planarization DOP2 of the redistribution layer RDL2 in an embodiment of the disclosure may be greater than or equal to 95%. The degree of planarization DOP2 of the redistribution layer RDL2 is defined as follows:

$$DOP2=[1-(h2/T2)]*100\%$$

h2 refers to the difference between the highest height and the lowest height of the top surface of the dielectric layer PM2; and T2 is the thickness of the conductive structures CV2.

The shape, size, and configuration method of the dummy structures DY2 may be similar to the shape, size, and configuration method of the dummy structures DY1, and are not repeated herein.

The width D2 of the dummy structures DY2 may be equal to the width L2 of the conductive structures CV2, but is not limited thereto. The ratio L2/D2 of the width L2 of the conductive structures CV2 to the width D2 of the dummy structures DY2 is, for example, between 1 and 10. As the width L2 of the conductive structures CV2 is larger, the interval range of the ratio L2/D2 at which the degree of planarization DOP2 may reach 95% is larger. As the width L2 of the conductive structures CV2 is smaller, the interval range of the ratio L2/D2 at which the degree of planarization DOP2 may reach 95% is smaller.

The ratio L2/S2 of the width L2 of the conductive structures CV2 to the gap width S2 is, for example, 1/2 to 12/1. In some other embodiments, the ratio L2/S2 of the width L2 of the conductive structures CV2 to the gap width S2 is 1/2 to 10/1. When the width L2 of the conductive structures CV2 is smaller and the ratio L2/S2 reaches a smaller value, the degree of planarization DOP2 may reach 95%. When the width L2 of the conductive structures CV2 is larger, the ratio L2/S2 is larger so that the degree of planarization DOP2 may reach 95%.

In some embodiments, by providing the dummy structures DY2, the degree of planarization DOP2 of the redistribution layer RDL2 may be increased from 60% to 75% or more, for example, 75% to 95%, or even higher. The degree of planarization DOP2 of the redistribution layer RDL2 may be equal to or higher than the degree of planarization DOP1 of the redistribution layer RDL1.

In addition, in FIG. 1B, the conductive structures CV2 and the conductive structures CV1 are completely overlapped in the longitudinal direction. The dummy structures DY2 are partially overlapped with the dummy structures DY1. The conductive structures CV2 and the dummy structures DY1 are not overlapped. The dummy structures DY2 and the conductive structures CV1 are not overlapped. However, the embodiments of the disclosure are not limited thereto. The extending directions of the conductive structures CV2 and the conductive structures CV1 may be the same or different, and may be completely overlapped, partially overlapped, or not overlapped in the longitudinal direction. The dummy structures DY2 and the dummy structures DY1 may be completely overlapped, partially overlapped, or not overlapped in the longitudinal direction. The conductive structures CV2 and the dummy structures DY1 may be completely overlapped, partially overlapped, or not overlapped in the longitudinal direction. The dummy structures DY2 and the conductive structures CV1 may be completely overlapped, partially overlapped, or not overlapped in the longitudinal direction. FIGS. 2B, 3B, 4B, and 5B show a plurality of embodiments to illustrate various redistribution structures RDLS.

Referring to FIGS. 2B, 3B, 4B, and 5B, the conductive structures CV1 and the conductive structures CV2 of the redistribution layers RDL1 and RDL2 in an embodiment of the disclosure have different extending directions, and are partially overlapped in the longitudinal direction. The dummy structures DY2 and the dummy structures DY1 may be partially overlapped or not overlapped in the longitudinal direction. The conductive structures CV2 and the dummy structures DY1 are not overlapped in the longitudinal direction. The dummy structures DY2 and the conductive structures CV1 are completely overlapped in the longitudinal direction.

In an embodiment, the dummy structures DY1 and DY2 have the shape of square, circle, polygon, and strip, respectively, as shown in FIGS. 2B, 3B, 4B, and 5B. The dummy structures DY1 and the dummy structures DY2 respectively have a single shape or a plurality of shapes. The shapes of the dummy structures DY1 and the dummy structures DY2 may be the same or different. The size of the dummy structures DY2 is smaller than the size of the dummy structures DY1, but is not limited thereto. The width of the dummy structures DY1 is equal to that of the conductive structures CV1, and the width of the dummy structures DY2 is equal to that of the conductive structures CV2, but are not limited thereto.

The ratio of the width L1 of the conductive structures CV1 to the gap width S1 and the ratio of the width L2 of the conductive structures CV2 to the gap width S2 are 1/2 to 12/1, respectively. In some other embodiments, the ratio of the width L1 of the conductive structures CV1 to the gap width S1 and the ratio of the width L2 of the conductive structures CV2 to the gap width S2 are 1/2 to 10/1. The degree of planarization DOP1 and the degree of planarization DOP2 of the redistribution layers RDL1 and RDL2 may be greater than 75%, even reach 95%, or greater.

The dummy structures DY1 and DY2 are respectively disposed around the conductive structures CV1 and CV2, so that the redistribution layers RDL1 and RDL2 have a flat top surface, thus facilitating the manufacturing process of RDL3 and improving the yield of the manufacturing process, and the conductive structure CV3 used as a high-frequency signal transmission line may have good electrical properties.

Referring to FIG. 1C, in some embodiments, the redistribution structure RDLS includes the redistribution layers RDL1, RDL2, and RDL3. The redistribution layer RDL3 is located on the redistribution layer RDL2. A conductive structure CV4 above the redistribution layer RDL3 is a key pattern. The key pattern is, for example, a high-frequency signal line.

The degrees of planarization DOP1 and DOP2 of the redistribution layers RDL1 and RDL2 may be less than or equal to 95%, for example, 65% or less. In some embodiments, the structure and forming method of the redistribution layers RDL1 and RDL2 may be, for example, the redistribution layer RDL1 having at least one conductive structure CV1, at least one dummy structure DY1, and a dielectric layer PM1 and the redistribution layer RDL2 having at least one conductive structure CV2, at least one dummy structure DY2, and a dielectric layer PM2 as described in the above embodiments. In some other embodiments, the structure of the redistribution layer RDL1 may include the conductive structures CV1 and not include the dummy structures DY1; the structure of the redistribution layer RDL2 may also include the conductive structures CV2 and not include the dummy structures DY2. In the present embodiment, the redistribution layer RDL1 has one conductive structure CV1, a plurality of dummy structures DY1, and a dielectric layer PM1, and the redistribution layer RDL2 has one conductive structure CV2, a plurality of dummy structures DY2, and a dielectric layer PM2.

After the redistribution layer RDL2 is formed, no additional planarization process is performed on the dielectric layer PM2, and the redistribution layer RDL3 is directly formed on the dielectric layer PM2. The structure of the redistribution layer RDL3 may be similar to or different from that of the redistribution layer RDL2.

The redistribution layer RDL3 includes at least one conductive structure CV3, at least one dummy structure DY3, and a dielectric layer PM3. In the embodiment shown in FIG. 1C, the redistribution layer RDL3 includes one conductive structure CV3, a plurality of dummy structures DY3, and a dielectric layer PM3, but the disclosure is not limited thereto. In another embodiment, the redistribution layer RDL3 includes a plurality of conductive structures CV3, a plurality of dummy structures DY3, and a dielectric layer PM3.

The conductive structures CV3 may include a trace located on the dielectric layer PM2. The conductive structures CV3 further include a through hole (not shown) penetrating the dielectric layer PM2 and connected to the trace of the conductive structures CV3 and the trace of the conductive structures CV2. The dummy structures DY3 are provided around the conductive structures CV3. The dummy structures DY3 are floating, electrically insulated from the trace in the conductive structures CV3, and electrically insulated from the trace of the conductive structures CV2 or subsequent components. The conductive structures CV3 have a width L3. The width L3 is, for example, a critical dimension of the conductive structures CV3. The dummy structures DY3 have a width D3. There is a gap width S3 between the dummy structures DY3 and the conductive structures CV3 and between the dummy structures DY3. In other embodiments, the redistribution layer RDL3 does not include a plurality of dummy structures DY3 (not shown).

The dielectric layer PM3 is disposed between the conductive structures CV3 and the dummy structures DY3 and on the surfaces thereof. The material and forming method of the dielectric layer PM3 may be the same as or different from the dielectric layer PM2. The dielectric layer PM3 is a coating layer without a planarization process (for example, a chemical mechanical polishing process). The ratio of a thickness T3 of the conductive structures CV3 to a thickness H3 of the dielectric layer PM3 is, for example, 1:1.1 to 1:1.6.

The thickness H3 of the dielectric layer PM3 refers to the distance from the lowest height of the bottom surface of the dielectric layer PM3 to the lowest height of the top surface of the dielectric layer PM3.

Similarly, the thickness H3 of the dielectric layer PM3, a difference h3 between the highest height and the lowest height of the top surface of the dielectric layer PM3, and the height T3 of the conductive structures CV3 may be obtained through measurement, thereby obtaining the degree of planarization DOP3 of the redistribution layer RDL3. The degree of planarization DOP3 of the redistribution layer RDL3 is defined as follows:

$$DOP3=[1-(h3/T3)]*100\%$$

h3 refers to the difference between the highest height and the lowest height of the top surface of the dielectric layer PM3; and T3 is the thickness of the conductive structures CV3.

The degree of planarization DOP3 of the redistribution layer RDL3 may be the same as or different from the degree of planarization DOP1 of the redistribution layer RDL1, and may be the same as or different from the degree of planarization DOP2 of the redistribution layer RDL2. In some embodiments, the degree of planarization DOP3 is greater than or equal to the degree of planarization DOP2 or DOP1. For example, the degree of planarization DOP1 and the degree of planarization DOP2 are less than 75%, and the degree of planarization DOP3 is 95% or more than 95%.

Hereinafter, referring to FIGS. 2C, 3C, 4C, and 5C, a plurality of embodiments are given to illustrate various redistribution structures RDLS.

Referring to FIGS. 2C, 3C, 4C, 5C, in some embodiments, a chip is disposed on the redistribution layer RDL3, and considering the electrical transmission issue, a high-frequency signal transmission line is designed above the redistribution layer RDL3 to shorten the distance between the high-frequency signal transmission line and the chip. That is, a conductive structure CV4 (not shown) above the redistribution layer RDL3 is a key pattern. The key pattern mentioned here may mean that the underlying layer or structure needs to have sufficient degree of planarization. Since the configuration of the dummy structures DY1 and DY2 may make the redistribution layer RDL2 have sufficient degree of planarization, the redistribution layer RDL3 does not need to be provided with the dummy structures DY3. Moreover, the conductive structures CV3 may be configured arbitrarily according to design requirements, so the conductive structures CV3 are not shown in the present example.

In some embodiments, the conductive structures CV1, CV2, CV3 all have the shape of a strip. The widths of the conductive structures CV1, CV2, CV3 may be the same or different. The extending directions of the conductive structures CV1, CV2, CV3 may be the same or different, and may be completely overlapped, partially overlapped, or not overlapped in the longitudinal direction. The dummy structures DY2 and the dummy structures DY1 may be completely overlapped, partially overlapped, or not overlapped in the longitudinal direction. The conductive structures CV3 and the dummy structures DY2 may be completely overlapped, partially overlapped, or not overlapped in the longitudinal direction.

If the dummy structures DY1 and/or DY2 are not provided, the redistribution layers RDL1 and RDL2 cause excessive height fluctuation of the redistribution layers RDL1 and RDL2 due to the low degrees of planarization of DOP1 and DOP2, so that the manufacture process of RDL3 is not readily performed, thus causing issues in process yield, or causing electrical issues in the conductive structures CV3.

In the above embodiments, the dummy structures DY1 and DY2 are respectively provided on both the redistribution layers RDL1 and RDL2. However, the dummy structures DY1 or DY2 may be optionally disposed on the redistribution layer RDL1 or RDL2, as shown in FIG. 6 and FIG. 7.

Figure 6:
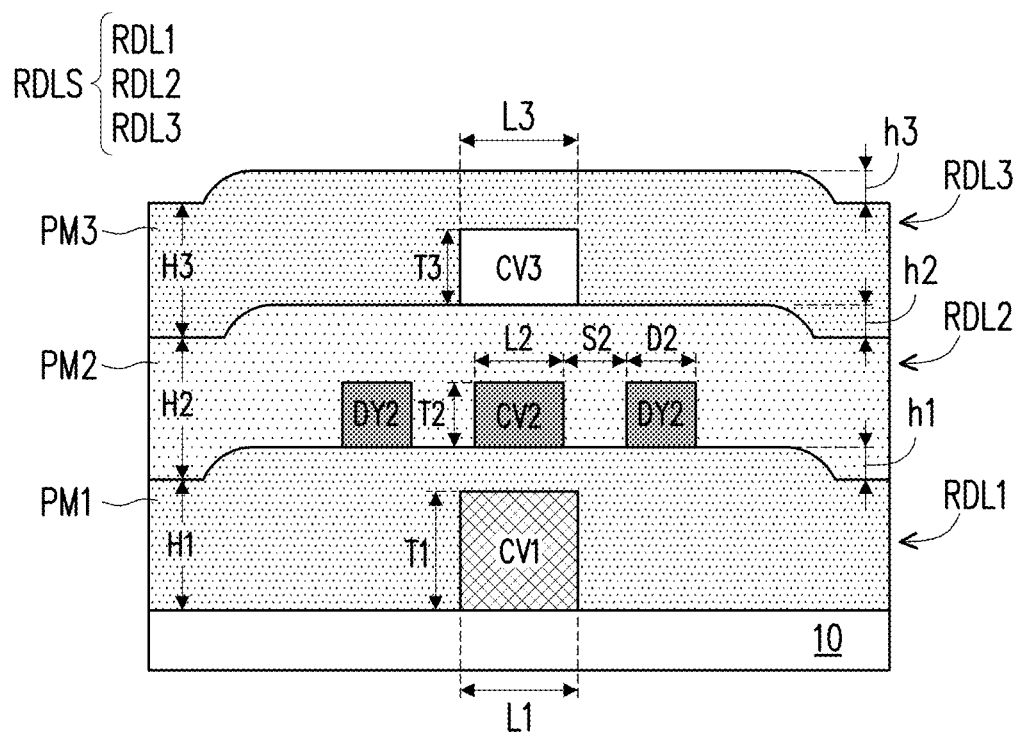
FIG. 6 and FIG. 7 are respectively cross-sectional views of two redistribution structures according to embodiments of the disclosure.

Referring to FIG. 6, in some embodiments, the dummy structures DY2 are disposed at the redistribution layer RDL2, and the dummy structures DY1 are not disposed at the redistribution layer RDL1, as long as the degree of planarization DOP2 of the redistribution layer RDL2 landed by the conductive structures CV3 as a key pattern (such as a high-frequency signal transmission line) may reach the desired level (such as 95%).

Referring to FIG. 7, in other embodiments, the dummy structures DY1 are disposed at the redistribution layer RDL1, and the dummy structures DY2 are not disposed at the redistribution layer RDL2, as long as the degree of planarization DOP2 of the redistribution layer RDL2 landed by the conductive structures CV3 of a key pattern (such as a high-frequency signal transmission line) may reach the desired level (such as 95%).

In addition, in the above embodiments, the dummy structures are disposed in the redistribution structure. In other embodiments, dummy structures may also be disposed in an under-bump metal layer structure UBM under the redistribution structure, as shown in FIG. 8, FIG. 13, and FIG. 18.

Figure 8:
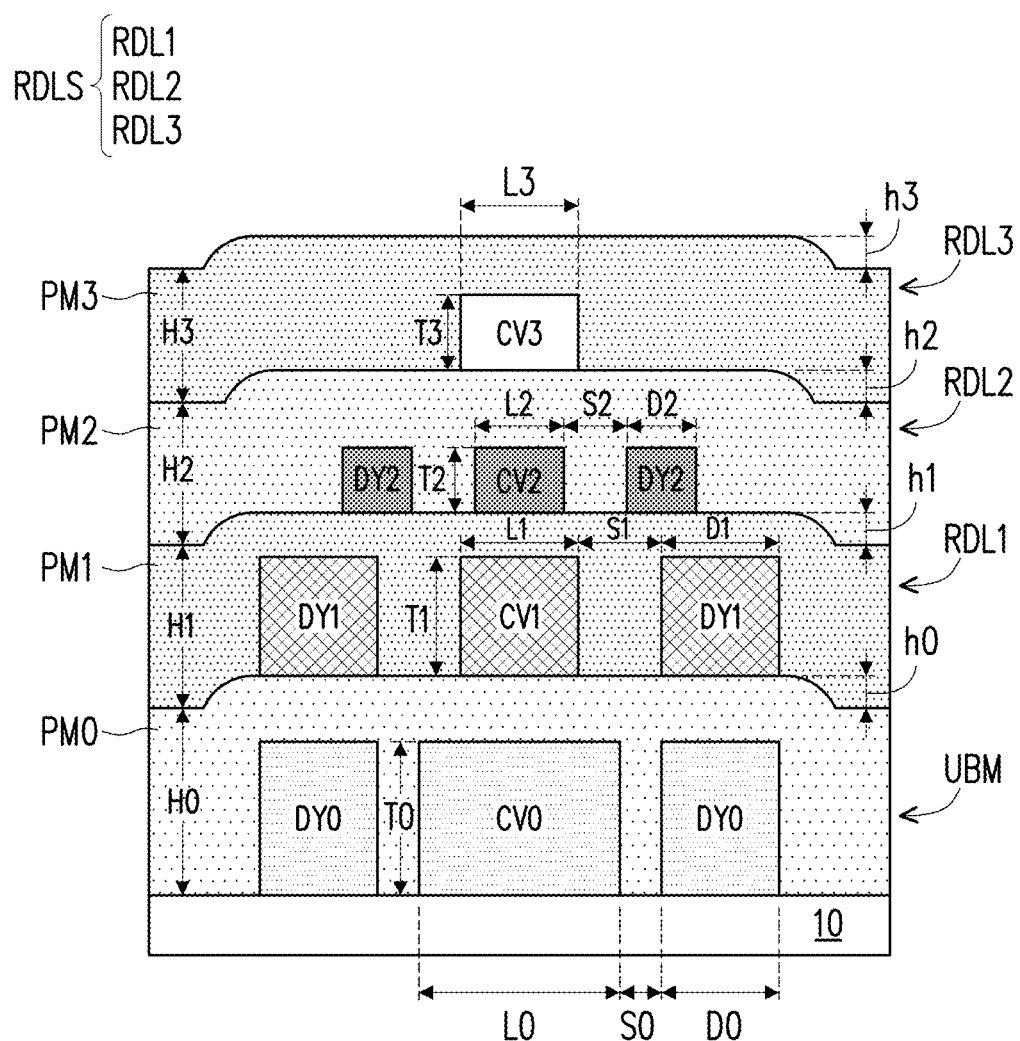
FIG. 8, FIG. 13, and FIG. 18 are respectively cross-sectional views of two redistribution structures and under-bump metal layer structures according to embodiments of the disclosure.
Figure 9:
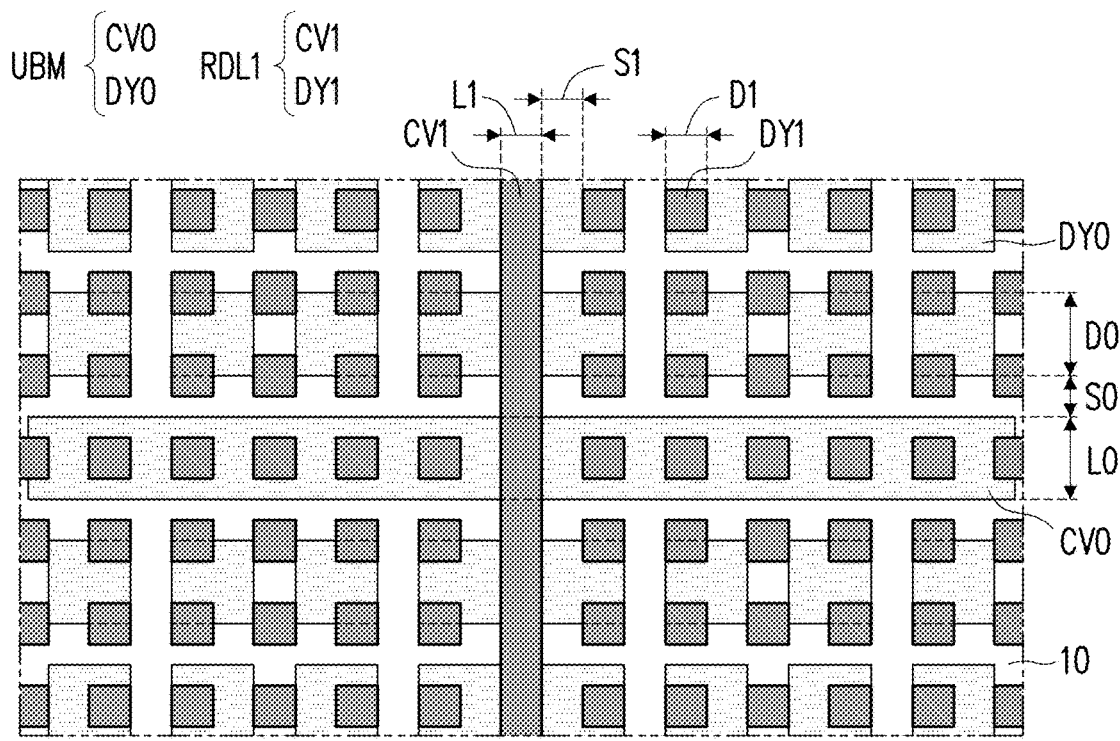
FIG. 9 to FIG. 12, FIG. 14 to FIG. 17, and FIG. 19 to FIG. 22 are respectively top views of a plurality of redistribution structures and under-bump metal layer structures according to embodiments of the disclosure.
Figure 10:
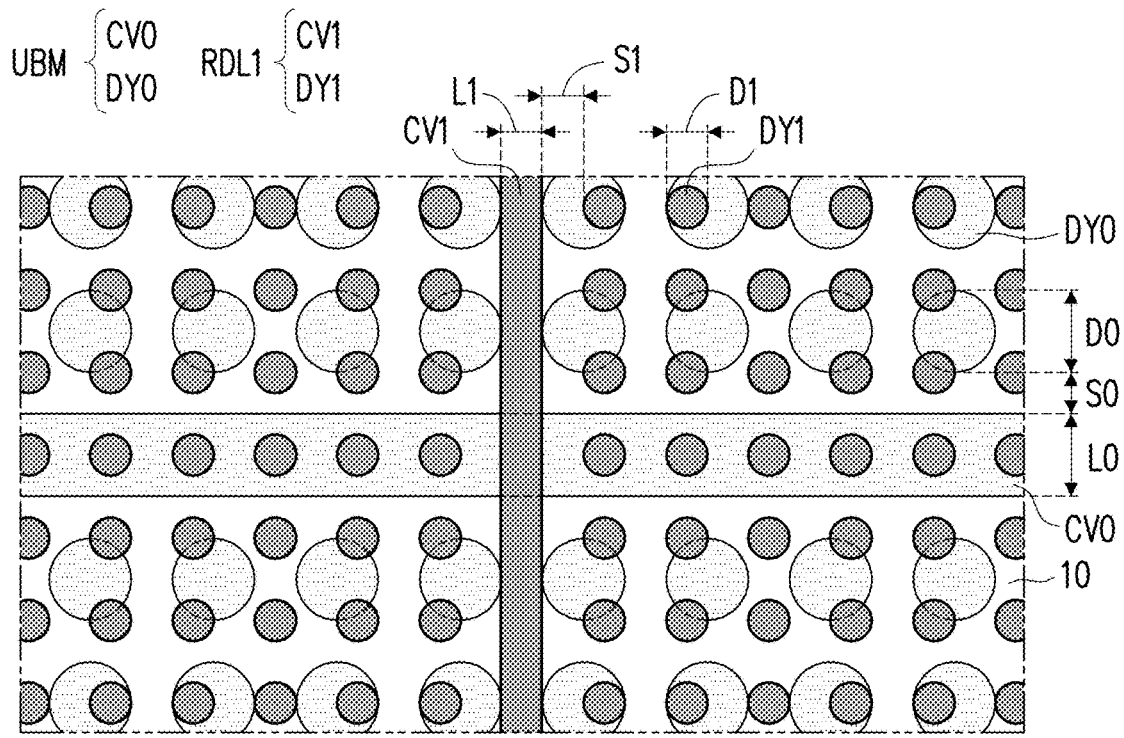
Figure 11:
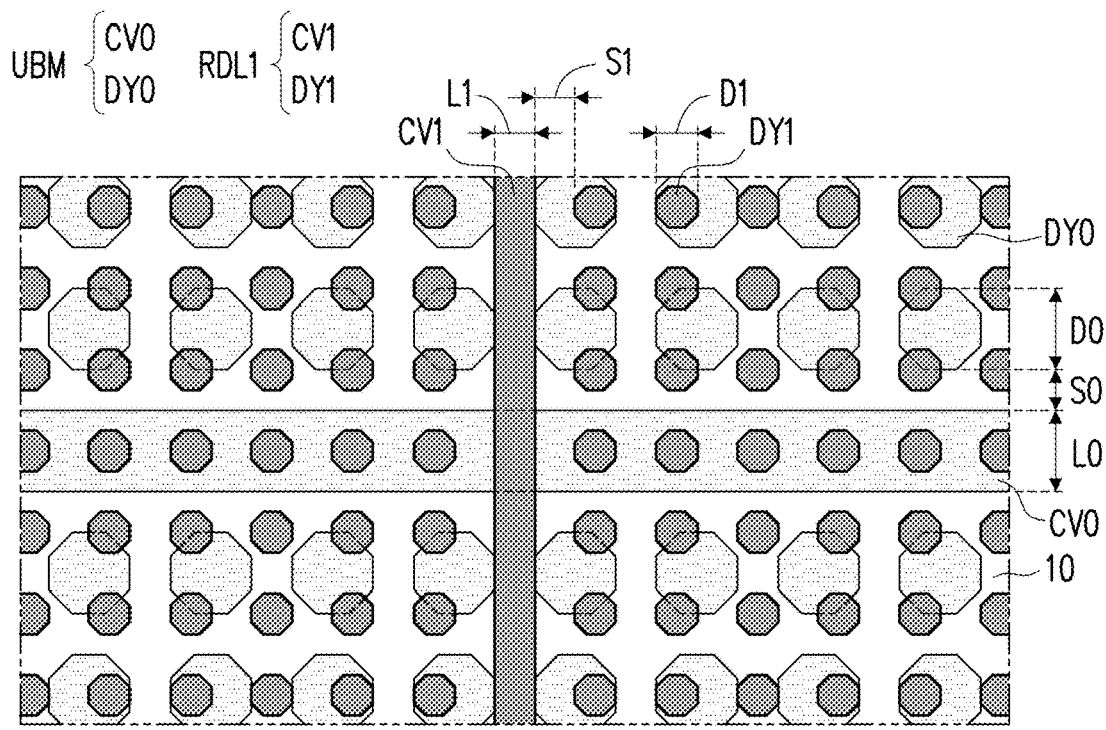
Figure 12:
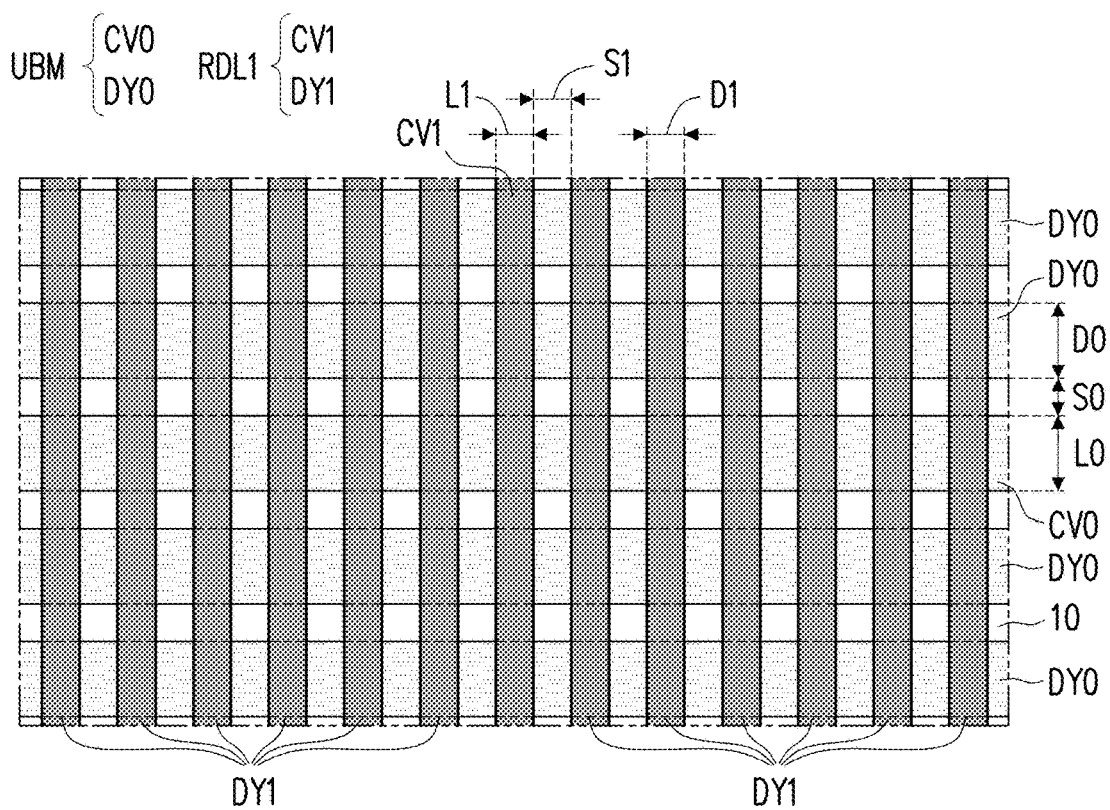
Figure 13:
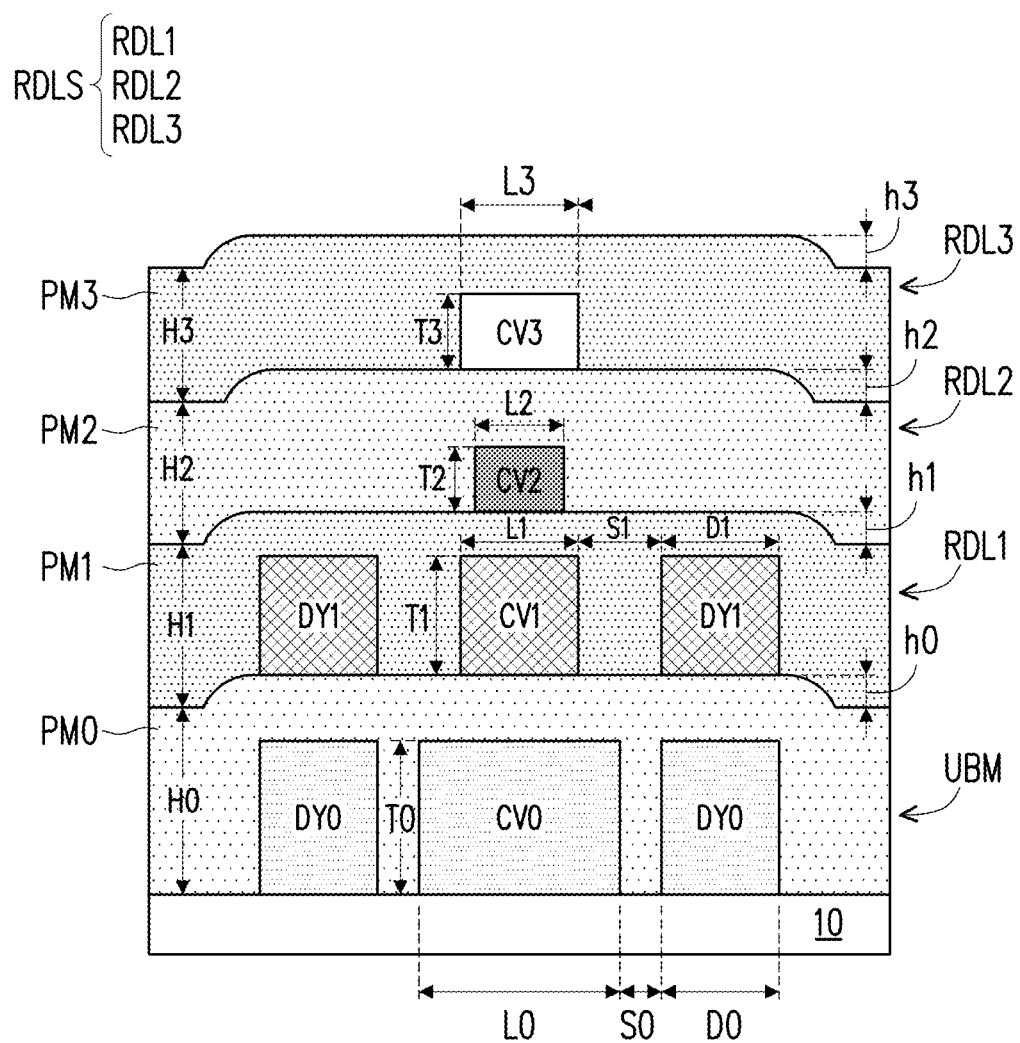
Figure 14:
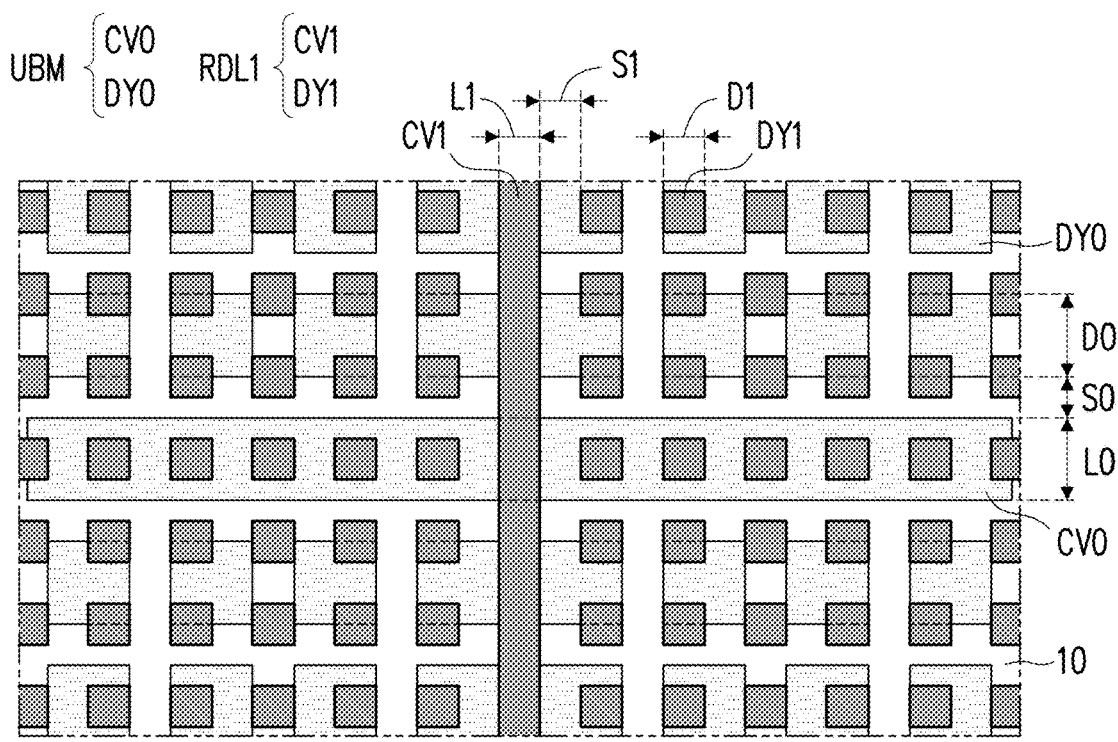
Figure 15:
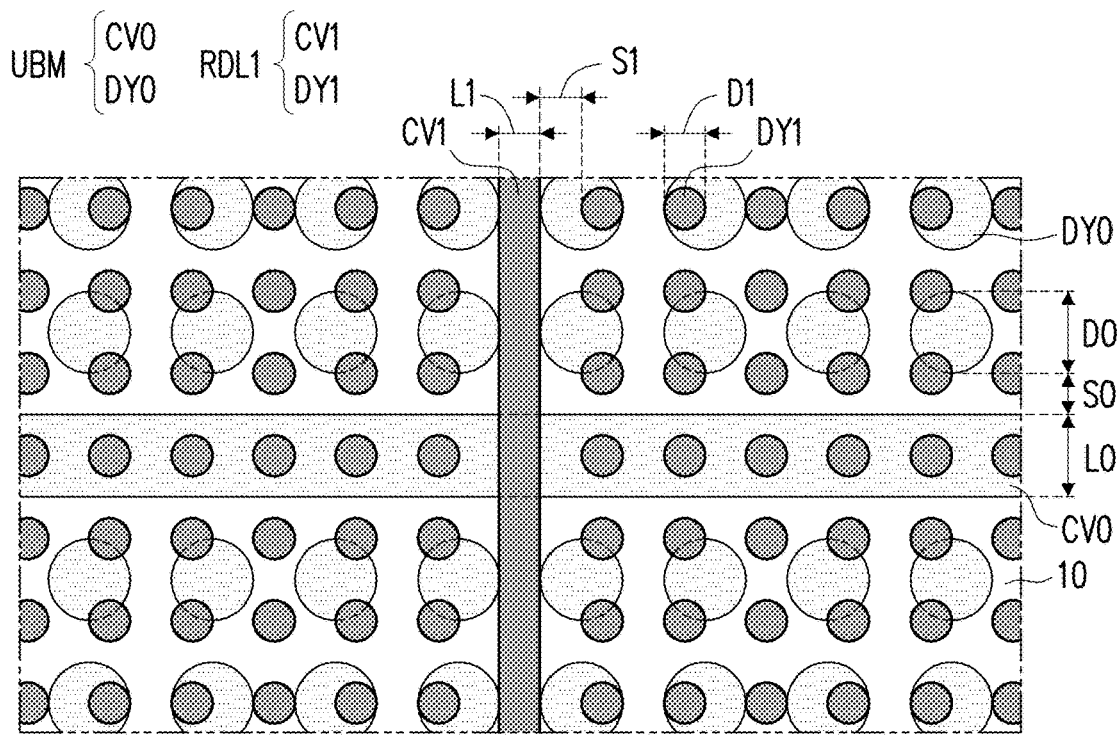
Figure 16:
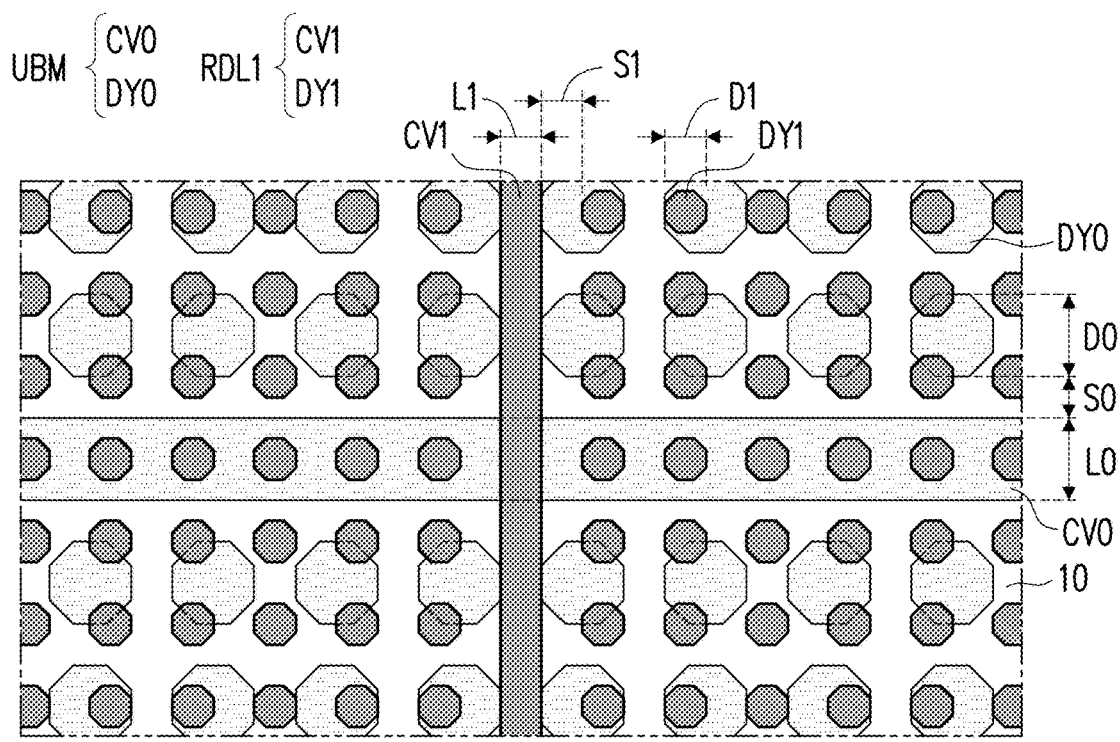
Figure 17:
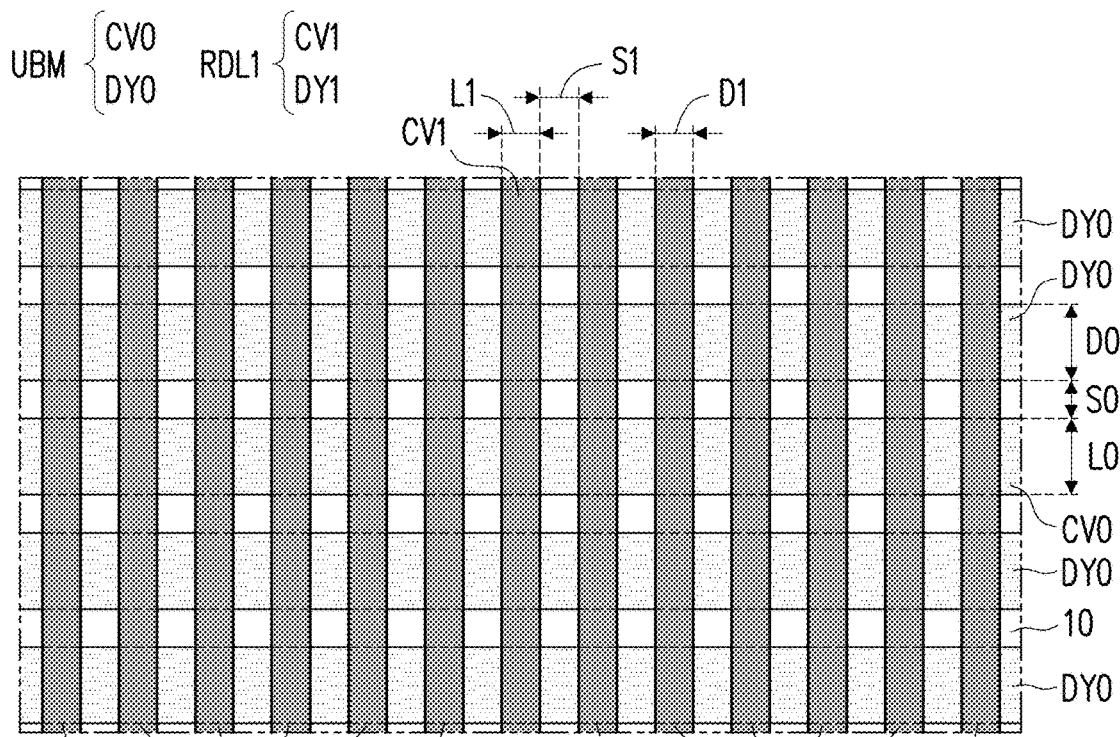
Figure 18:
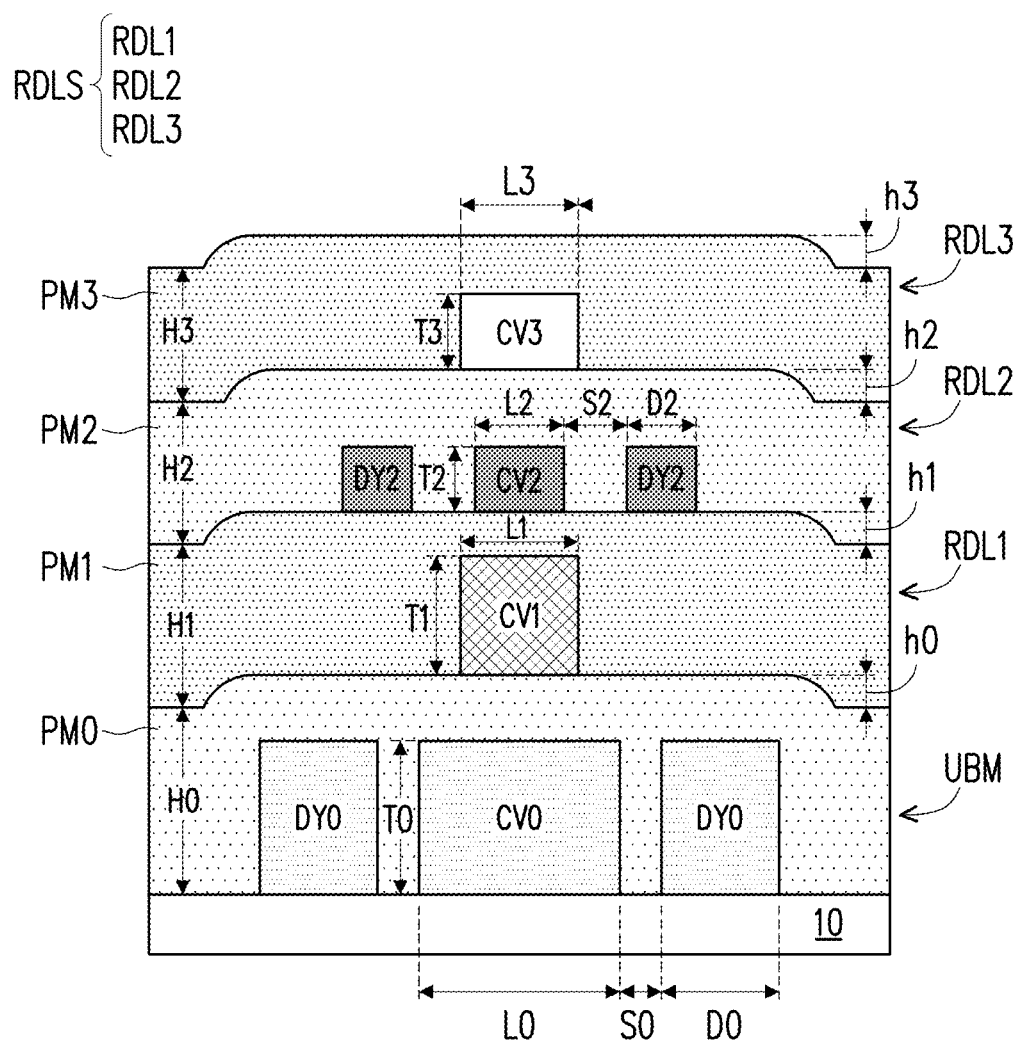
Figure 19:
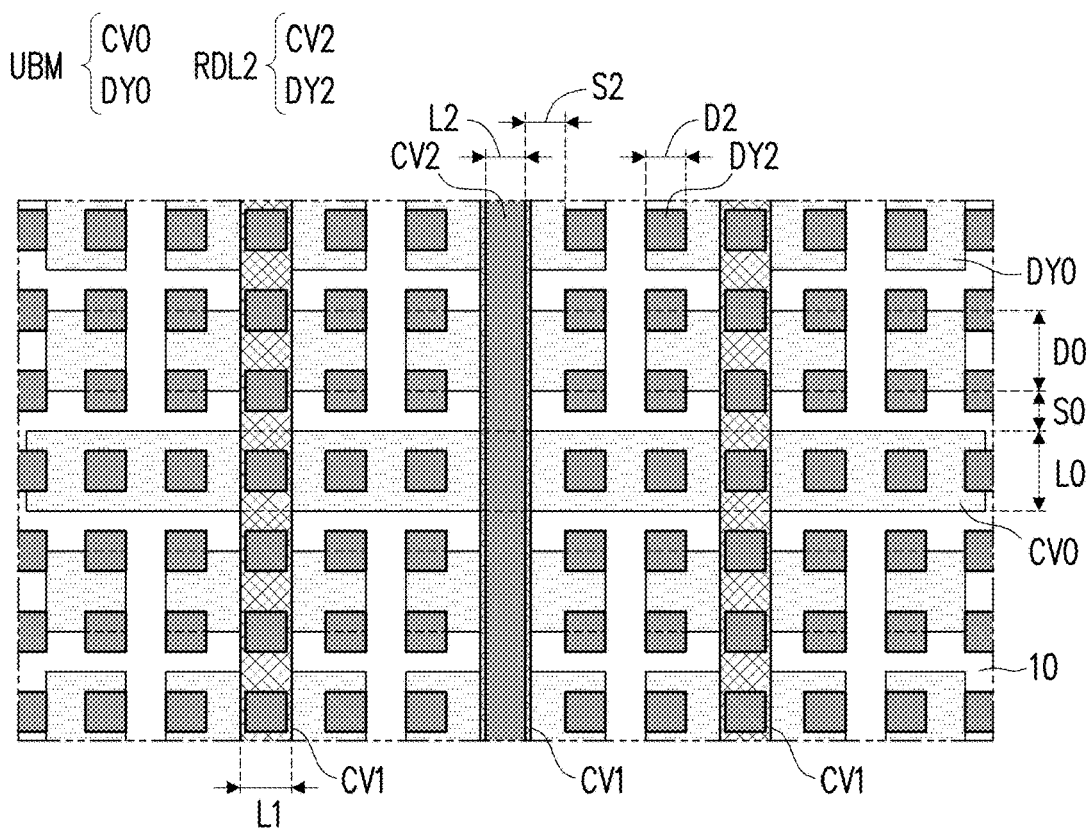
Figure 20:
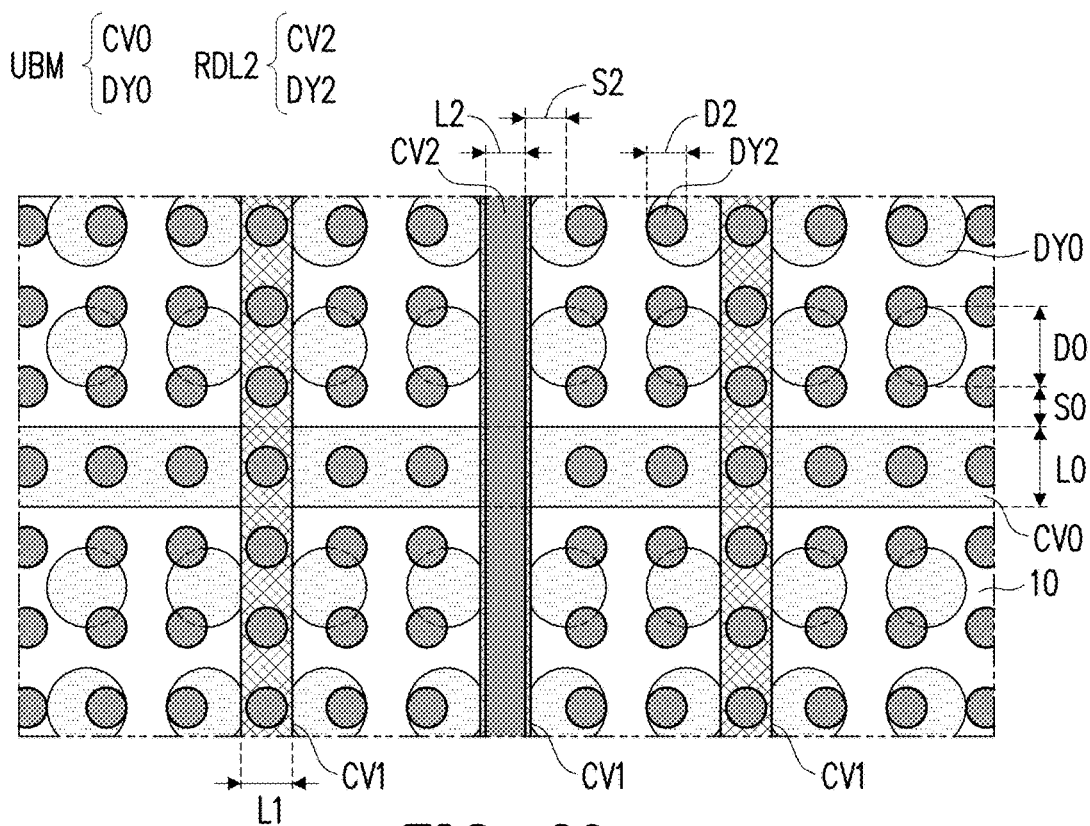
Figure 21:
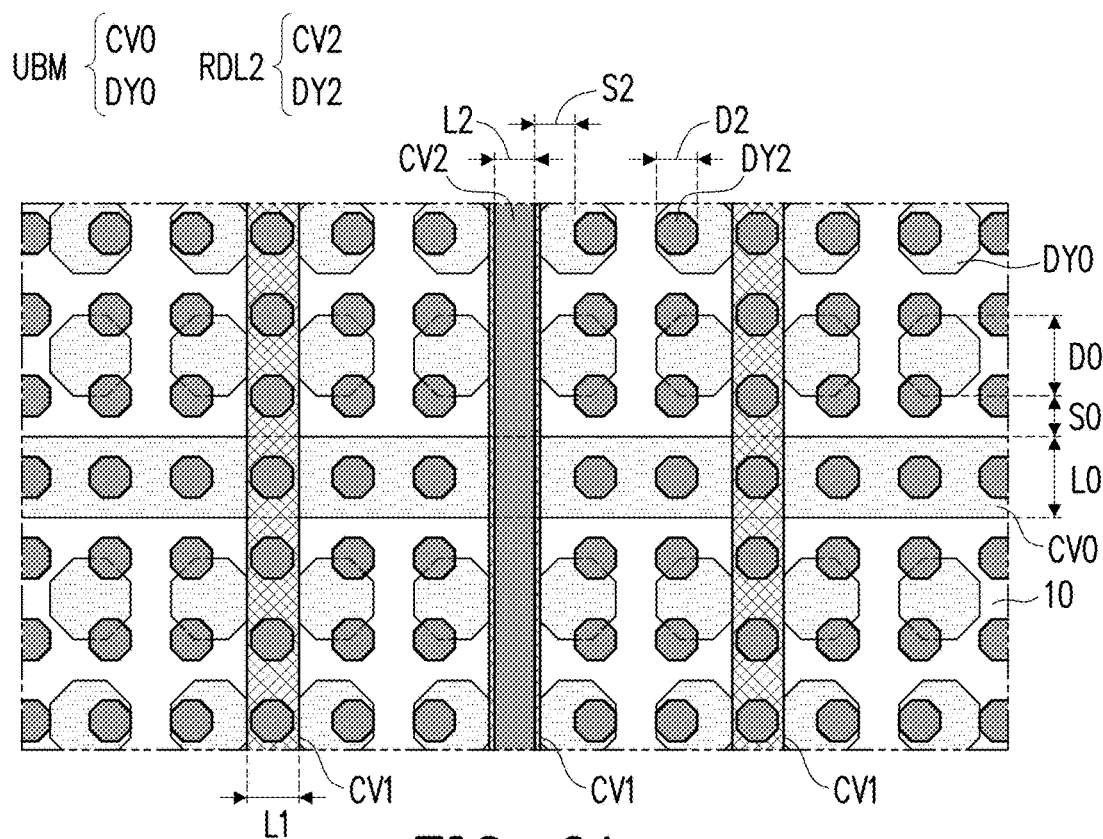
Figure 22:
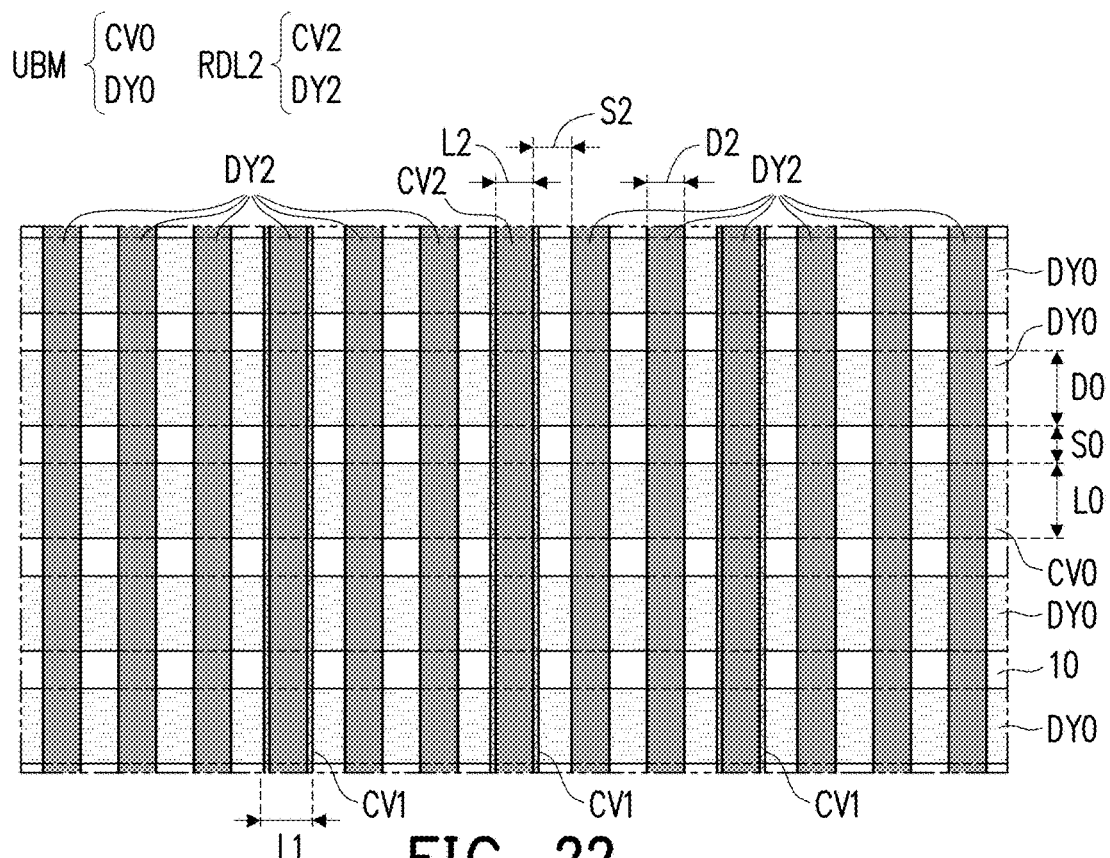

Referring to FIG. 8, FIG. 13, and FIG. 18, the redistribution structure RDLS includes the redistribution layers RDL1, RDL2, and RDL3. The conductive structure CV3 of the redistribution layer RDL3 is a key pattern, such as a high-frequency signal transmission line. In addition to a conductive structure CV0 and a dielectric layer PM0, the under-bump metal layer structure UBM under the redistribution layer RDL1 also includes dummy structures DY0.

The under-bump metal layer structure UBM includes at least one conductive structure CV0, at least one dummy structure DY0, and a dielectric layer PM0. In the embodiments shown in FIGS. 8, 13, and 18, the under-bump metal layer structure UBM includes one conductive structure CV0, a plurality of dummy structures DY0, and a dielectric layer PM0, but the disclosure is not limited thereto. In another embodiment, the under-bump metal layer structure UBM includes a plurality of conductive structures CV0, a plurality of dummy structures DY0, and a dielectric layer PM0. In yet another embodiment, the under-bump metal layer structure UBM includes a plurality of conductive structures CV0, one dummy structure DY0, and a dielectric layer PM0.

The conductive structures CV0 are located on the substrate 10. The conductive structures CV0 are, for example, copper pillars. The dummy structures DY0 are disposed between the plurality of conductive structures CV0. The dummy structures DY0 are floating, electrically insulated from the conductive structures CV0, and electrically insulated from the subsequently formed conductive structures CV1. The conductive structures CV0 have a width L0. The width L0 is, for example, a critical dimension of the conductive structures CV0. The dummy structures DY0 have a width D0. There is a gap width S0 between the dummy structures DY0 and the conductive structures CV0 and between the dummy structures DY0.

The dielectric layer PM0 is disposed between the conductive structures CV0 and the dummy structures DY0 and on the surfaces thereof. The dielectric layer PM0 includes a polymer, for example, photosensitive polyimide (PSPI), polyimide, polybenzoxazole (PBO), benzocyclobutene (BCB), and the like. The dielectric layer PM0 is a coating layer without a planarization process (for example, a chemical mechanical polishing process). The forming method of the dielectric layer PM0 is, for example, a spin coating method.

A degree of planarization DOP0 of the under-bump metal structure UBM in an embodiment of the disclosure may be greater than or equal to 95%. The definition of the degree of planarization DOP0 is as follows:

$$DOP0=[1-(h0/T0)]*100\%$$

h0 refers to the difference between the highest height and the lowest height of the top surface of the dielectric layer PM0; and T0 is the height of the conductive structures CV0.

In some embodiments, the ratio of the width L0 of the conductive structures CV0 to the gap width S0 is 1/2 to 12/1. In some other embodiments, the ratio of the width L0 of the conductive structures CV0 to the gap width S0 is 1/2 to 10/1. In the present embodiment, by providing the dummy structures DY0, the degree of planarization DOP0 of the under-bump metal layer structure UMB may be increased from 60% to 75% or more, for example, 75% to 95%, or even higher. The degree of planarization DOP0 of the under-bump metal layer structure UBM may be the same as or different from the degree of planarization DOP1 of the redistribution layer RDL1 or the degree of planarization DOP2 of the redistribution layer RDL2. In some embodiments, the degree of planarization DOP0 is greater than or equal to the degree of planarization DOP1 or the degree of planarization DOP2. In some other embodiments, the degree of planarization DOP0 is smaller than or equal to the degree of planarization DOP1 or the degree of planarization DOP2.

The dummy structures DY0 may have a single shape or a plurality of shapes. The shape of the dummy structures DY0 is square, polygonal, or a dot and a strip, as shown in FIG. 9 to FIG. 12, FIG. 14 to FIG. 17, and FIG. 19 to FIG. 22, respectively.

The width D0 of the dummy structures DY0 may be equal to the width L0 of the conductive structures CV0, but is not limited thereto. The width D0 of each of the dummy structures DY0 may be the same or different. The ratio L0/D0 of the width L0 of the conductive structures CV0 to the width D0 of the dummy structures DY0 is, for example, between 1 and 10.

In some embodiments, the dummy structures DY0 of the under-bump metal layer structure UBM have a single width D0. In some other embodiments, the under-bump metal layer structure UBM has dummy structures DY0 with 2 or more widths D0. The dummy structures DY0 may be disposed between the conductive structures CV0 with a fixed gap width S0 or various gap widths S0. In some embodiments, there is a single gap width S0 between the dummy structures DY0 and the conductive structures CV0 of the under-bump metal layer structure UBM. In some other embodiments, there are 2 or more gap widths S0 between the dummy structures DY0 and the conductive structures CV0 of the under-bump metal layer structure UBM. In some embodiments, the ratio of the width L0 of the conductive structures CV0 to the gap width S0 is 1/2 to 12/1. In some other embodiments, the ratio of the width L0 of the conductive structures CV0 to the gap width S0 is 1/2 to 10/1.

When the width L0 of the conductive structures CV0 is larger, the interval range of the ratio L0/D0 at which the degree of planarization DOP0 may reach 95% is larger. When the width L0 of the conductive structures CV0 is smaller, the interval range of the ratio L0/D0 at which the degree of planarization DOP0 may reach 95% is smaller. When the width L0 of the conductive structures CV0 is smaller and the ratio L0/S0 reaches a smaller value, the degree of planarization DOP0 may reach 95%. When the width L0 of the conductive structures CV0 is larger, the ratio L0/S0 is larger so that the degree of planarization DOP0 may reach 95%.

In an embodiment of the disclosure, by providing the dummy structures DY0, the degree of planarization DOP0 of the under-bump metal layer structure UMB may be increased from 60% to 75% or more, for example, 75% to 95%, or even higher.

A single redistribution layer (not shown) or a redistribution structure RDLS having a plurality of redistribution layers may be covered above the under-bump metal layer structure UBM, as shown in FIG. 8 to FIG. 22.

Referring to FIG. 8, FIG. 13, and FIG. 18, the redistribution structure RDLS above the under-bump metal layer structure UBM includes redistribution layers RDL1, RDL2, and RDL3.

The under-bump metal layer structure UBM in FIG. 8 includes a conductive structure CV0, a plurality of dummy structures DY0, and a dielectric layer PM0. The redistribution layer RDL1 includes a conductive structure CV1, a plurality of dummy structures DY1, and a dielectric layer PM1. The redistribution layer RDL2 includes a conductive structure CV2, a plurality of dummy structures DY2, and a dielectric layer PM2. The redistribution layer RDL3 includes a conductive structure CV3 and a dielectric layer PM3.

Referring to FIG. 8, the conductive structures CV0 of the under-bump metal layer structure UBM and the conductive structures CV1, CV2, and CV3 of the redistribution layers RDL1, RDL2, and RDL3 all have the shape of a strip, for example. The width L0 of the conductive structures CV0 and the widths L1, L2, and L3 of CV1, CV2, and CV3 may be the same or different. The extending direction of the conductive structures CV0 may be the same as or different from the extending directions of CV1, CV2, and CV3. The conductive structures CV0 and the conductive structures CV1 are completely overlapped in the longitudinal direction. The dummy structures DY0 are completely overlapped with the dummy structures DY1. The conductive structures CV0 and the dummy structures DY1 are not overlapped. The dummy structures DY0 and the conductive structures CV1 are not overlapped. However, the embodiments of the disclosure are not limited thereto. The extending directions of the conductive structures CV0 and the conductive structures CV1 may be the same or different, and may be completely overlapped, partially overlapped, or not overlapped in the longitudinal direction. The dummy structures DY0 and the dummy structures DY1 may be completely overlapped, partially overlapped, or not overlapped in the longitudinal direction. The conductive structures CV0 and the dummy structures DY1 may be completely overlapped, partially overlapped, or not overlapped in the longitudinal direction. The dummy structures DY0 and the conductive structures CV1 may be completely overlapped, partially overlapped, or not overlapped in the longitudinal direction. FIGS. 9 to 12 show a plurality of embodiments to illustrate various redistribution structures RDLS.

In the embodiments of FIG. 9 to FIG. 12, the dummy structures DY0 and DY1 have the shape of square, circle, polygon, and strip, respectively. The dummy structures DY0 and DY1 respectively have a single shape, but are not limited thereto. The width D1 of the dummy structures DY1 is smaller than the width D0 of the dummy structures DY0, but is not limited thereto. The width of the dummy structures DY0 is equal to that of the conductive structures CV0, and the width of the dummy structures DY1 is equal to that of the conductive structures CV1, but are not limited thereto. The locations of the dummy structures DY0 and the dummy structures DY1 may be completely overlapped, partially overlapped, or not overlapped. Similarly, the locations of the dummy structures DY0 and the conductive structures CV1 may be completely overlapped, partially overlapped, or not overlapped.

In the present embodiment, via the configuration of the dummy structures DY0 and DY1, the redistribution layer RDL2 may already achieve the desired degree of planarization. Therefore, the redistribution layer RDL2 does not need to be provided with the dummy structures DY2, and the conductive structures CV2 and CV3 of the redistribution layers RDL2 and RDL3 may be disposed in any location according to design or needs. Therefore, the redistribution layers RDL2 and RDL3 are not shown in FIG. 9 to FIG. 12.

The degree of planarization DOP0 of the under-bump metal layer structure UBM, the degree of planarization DOP1 of the redistribution layer RDL1, and the degree of planarization DOP2 of the redistribution layer RDL2 may reach 95% or more. The degree of planarization DOP3 of the redistribution layer RDL3 may be greater than 75%, even reach 95%, or greater.

Referring to FIG. 13, in some other embodiments, the redistribution layer RDL2 does not have the dummy structures DY2. Via the configuration of the dummy structures DY0 of the under-bump metal layer structure UBM and the dummy structures DY1 of the redistribution layer RDL1, the redistribution layer RDL2 may have a high degree of planarization DOP2 so that the conductive structures CV3 of the redistribution layer RDL3 may be formed on the planarized redistribution layer RDL2. FIGS. 14, 15, 16, and 17 show a plurality of embodiments to illustrate various redistribution structures RDLS.

Referring to FIGS. 14, 15, 16, and 17, the conductive structures CV0 of the under-bump metal layer structure UBM and the conductive structures CV1 of the redistribution layer RDL1 all have the shape of a strip, but the extending directions thereof are different and are partially overlapped. The width L0 of the conductive structures CV0 and the width L1 of the conductive structures CV1 may be the same or different. In the embodiments of FIG. 14 to FIG. 17, the shapes and widths of the dummy structures DY0 and DY1 are as provided in the above description with reference to the dummy structures DY0 and DY1 of FIG. 9 to FIG. 12, and are not be repeated herein. In the present embodiment, via the configuration of the dummy structures DY0 and DY1, the redistribution layer RDL2 may already achieve the desired degree of planarization. Therefore, the redistribution layer RDL2 does not need to be provided with the dummy structures DY2, and the conductive structures CV2 and CV3 of the redistribution layers RDL2 and RDL3 may be disposed in any location according to design or needs. Therefore, the redistribution layers RDL2 and RDL3 are not shown in FIG. 14 to FIG. 17.

The degree of planarization DOP0 of the under-bump metal layer structure UBM and the degree of planarization DOP1 of the redistribution layer RDL1 may reach 95% or more. The degree of planarization DOP2 of the redistribution layer RDL2 and the degree of planarization DOP3 of the redistribution layer RDL3 may be greater than 75%, even reach 95%, or greater.

Referring to FIG. 18, in some embodiments, the redistribution layer RDL1 does not include dummy structures. By disposing the dummy structures DY0 and DY2 in the under-bump metal layer structure UBM and the redistribution layer RDL2, the redistribution layer RDL2 may have a high degree of planarization DOP2, so that the conductive structures CV3 of the redistribution layer RDL3 may be formed on the redistribution layer RDL2 having a high degree of planarization. Therefore, the dummy structures DY1 may not be disposed around the conductive structures CV1 of the redistribution layer RDL1. FIGS. 19 to 22 show a plurality of embodiments to illustrate various redistribution structures RDLS.

Referring to FIG. 19 to FIG. 22, the conductive structures CV0, CV1, and CV2 of the under-bump metal layer structure UBM, the redistribution layers RDL1 and RDL2 all have the shape of a strip. The widths of the conductive structures CV0, CV2, CV1 may be the same or different. In the embodiments of FIG. 19 to FIG. 22, the extending directions of the conductive structures CV0, CV1, and CV2 may be the same or different. The extending direction of the conductive structures CV0 is different from the extending direction of the conductive structures CV1 and CV2 and partially overlapped with the conductive structures CV1 and CV2. The extending directions of the conductive structures CV2 and CV1 are the same and partially overlapped.

In the embodiments of FIG. 19 to FIG. 22, the dummy structures DY0 and DY2 have the shape of square, circle, polygon, and strip, respectively. The dummy structures DY0 and DY2 respectively have a single shape, but are not limited thereto. The size of the dummy structures DY2 is smaller than the size of the dummy structures DY0, but is not limited thereto. The width of the dummy structures DY0 may be equal to that of the conductive structures CV0, and the width of the dummy structures DY2 is equal to that of the conductive structures CV2, but are not limited thereto. The locations of the dummy structures DY0 and the dummy structures DY2 may be completely overlapped, partially overlapped, or not overlapped. Similarly, the locations of the dummy structures DY0 and the conductive structures CV2 may be completely overlapped, partially overlapped, or not overlapped. The locations of the dummy structures DY0 and the conductive structures CV1 may be completely overlapped, partially overlapped, or not overlapped. In FIGS. 19 to 22, the locations of the dummy structures DY0 and the dummy structures DY2 may be completely overlapped or partially overlapped. The locations of the dummy structures DY0 and the conductive structures CV2 are not overlapped. The locations of the dummy structures DY0 and the conductive structures CV1 are partially overlapped, but are not limited thereto. To prevent the figures from being too complicated, the redistribution layer RDL3 is not shown in FIG. 19 to FIG. 22.

The degree of planarization DOP0 of the under-bump metal layer structure UBM, the degree of planarization DOP1 of the redistribution layer RDL1, and the degree of planarization DOP2 of the redistribution layer RDL2 may reach 95% or more. The degree of planarization DOP3 of the redistribution layer RDL3 may be greater than 75%, even reach 95%, or greater. In the present example, via the configuration of the dummy structures DY0 and DY2, the redistribution layer RDL2 may already achieve the desired degree of planarization. Therefore, the redistribution layer RDL1 does not need to be provided with the dummy structures DY1, and the conductive structures CV2 and CV3 of the redistribution layers RDL2 and RDL3 may be disposed in any location according to design or needs. Therefore, the redistribution layer RDL3 is not shown in FIG. 19 to FIG. 22.

In some embodiments, the under-bump metal layer structure UBM and the redistribution structure RDLS are independent components. In some other embodiments, the under-bump metal layer structure UBM may also be regarded as a portion of the redistribution structure RDLS.

Figure 23:
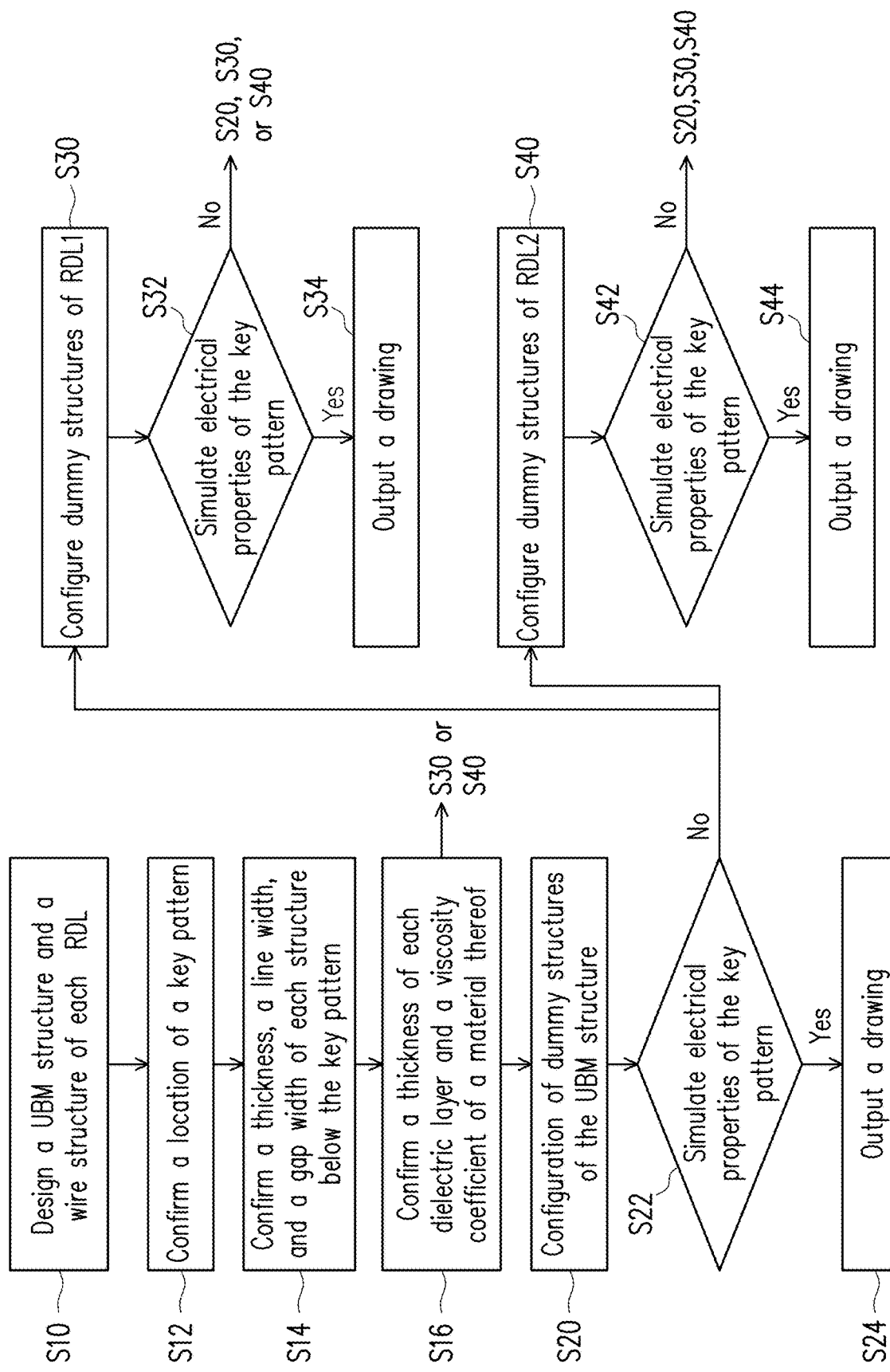
FIG. 23 and FIG. 24 are manufacturing flowcharts of a redistribution structure and an under-bump metal layer structure according to embodiments of the disclosure.
Figure 24:
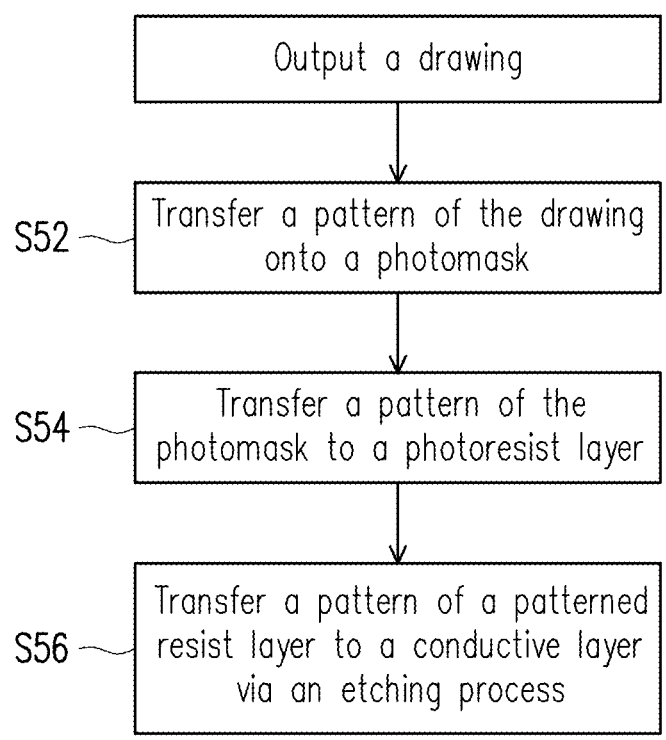

FIG. 23 and FIG. 24 are manufacturing flowcharts of a redistribution structure and an under-bump metal layer structure according to an embodiment of the disclosure. Please refer to step S10 of FIG. 23. In the manufacturing method of a redistribution layer and an under-bump metal layer of an embodiment of the disclosure, the under-bump metal layer structure UBM and the conductive structures of each redistribution layer may be designed according to actual needs. In step S12, the location of a key pattern is confirmed. The key pattern is, for example, a high-frequency signal line disposed on the redistribution layer RDL3. In step S14, the thickness, line width, and gap width of each conductive structure under the key pattern are confirmed, such as the thickness, line width, and gap width of the under-bump metal layer structure UBM, RDL1, and RDL2. In step S16, the thickness of each dielectric layer and the viscosity coefficient of the material thereof are confirmed.

In step S20, the dummy structures of the under-bump metal layer structure UBM is configured. The configuration of the dummy structures of the under-bump metal layer structure UBM includes setting the size (e.g., width, length, diameter) of the dummy structures, the gap width between the dummy structures and the conductive structures, and the gap width between the dummy structures.

In step S22, the process parameters of each layer are brought into a simulation structure to simulate the electrical properties of the key pattern.

If the electrical properties of the key pattern simulated in step S22 meet the requirements, the drawings of the under-bump metal layer structure UBM, RDL1, RDL2, and RDL3 may be directly outputted without the need to provide dummy structures in the redistribution layer RDL1, RDL2, or RDL3, as described in step S24.

If the electrical properties of the key pattern simulated in step S22 do not meet the requirements, step S30 or step S40 is performed, or step S20 is repeated. Returning to step S20, the dummy structures may be configured with different widths and different gap widths.

In some embodiments, steps S20 to 24 may be omitted, and after step S16, step S30 or step S40 is directly performed.

In step S30, the dummy structures of the redistribution layer RDL1 are configured. The configuration of the dummy structures of RDL1 includes setting the size (e.g., width, length, diameter) of the dummy structures, the gap width between the dummy structures and the conductive structures, and the gap width between the dummy structures.

In step S32, the process parameters of each layer are brought into a simulation structure to simulate the electrical properties of the key pattern.

If the electrical properties of the key pattern simulated in step S32 meet the requirements, the drawings of the under-bump metal layer structure UBM, RDL1, RDL2, and RDL3 may be directly outputted without the need to provide dummy structures in the redistribution layer RDL2 or RDL3, as described in step S34.

If the electrical properties of the key pattern simulated in step S32 do not meet the requirements, step S40 is performed, or step S20 or step S30 is repeated. Returning to step S20 or S30, the dummy structures may be configured with different widths and different gap widths.

In step S40, the dummy structures of RDL2 are configured. The configuration of the dummy structures of RDL2 includes setting the size (e.g., width, length, diameter) of the dummy structures, the gap width between the dummy structures and the conductive structures, and the gap width between the dummy structures.

In step S42, the process parameters of each layer are brought into a simulation structure to simulate the electrical properties of the key pattern.

If the electrical properties of the key pattern simulated in step S42 meet the requirements, the drawings of the under-bump metal layer structure UBM, RDL1, RDL2, and RDL3 may be directly outputted without the need to provide dummy structures in the redistribution layer RDL3, as described in step S44.

If the electrical properties of the key pattern simulated in step S42 do not meet the requirements, step S20, S30, or S40 is repeated to configure dummy structures with different widths and different gap widths.

Referring to FIG. 24, after a drawing is outputted, step S52 is performed to transfer the pattern of the drawing onto a photomask, and then step S54 is performed to transfer the pattern of the photomask to a photoresist layer. Then, step S56 is performed, and a pattern of a patterned resist layer is transferred to a conductive layer via an etching process to form a conductive structure and a dummy structure. These steps may be described in conjunction with FIG. 25A to FIG. 25H.

FIG. 25A to FIG. 25H are process cross-sectional views of a manufacturing method of a package structure according to an embodiment of the disclosure.

Figure 25A:
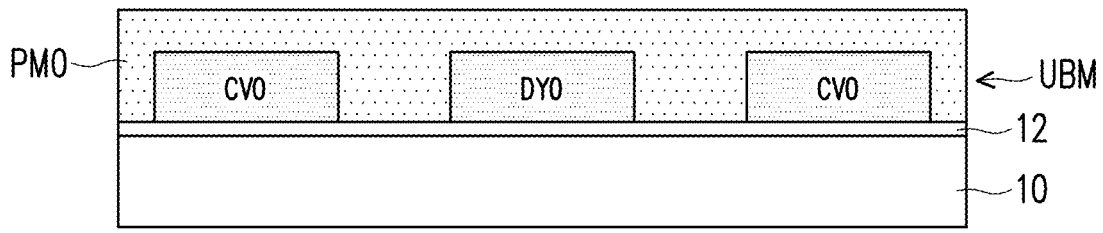
FIG. 25A to FIG. 25H are process cross-sectional views of a manufacturing method of a package structure according to an embodiment of the disclosure.

Referring to FIG. 25A, a release layer 12 is formed on a substrate 10 first, and then an under-bump metal layer structure UBM is formed. The under-bump metal layer structure UBM includes conductive structures CV0, a dummy structure DY0, and a dielectric layer PM0. The conductive structures CV0 and the dummy structure DY0 are not electrically connected. The conductive structures CV0 and the dummy structure DY0 may be formed according to steps S52 to S56 of FIG. 24. The dielectric layer PM0 may be formed after the conductive structures CV0 and the dummy structure DY0 are formed.

Figure 25B:
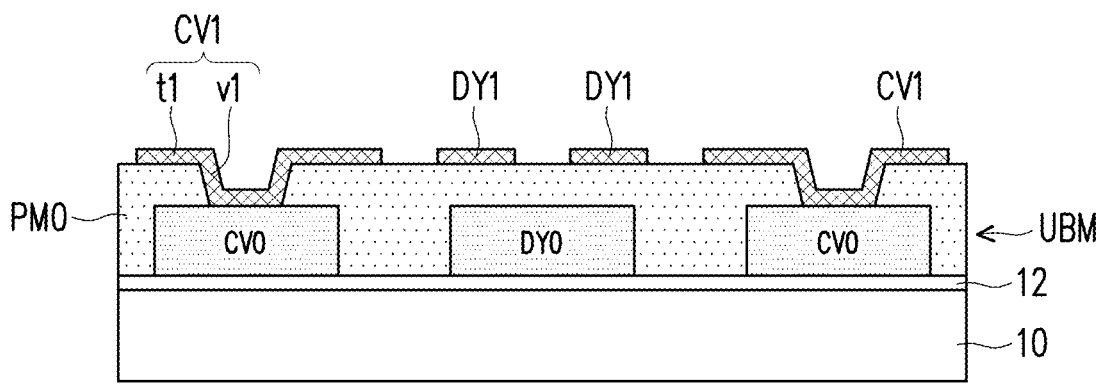
Figure 25C:
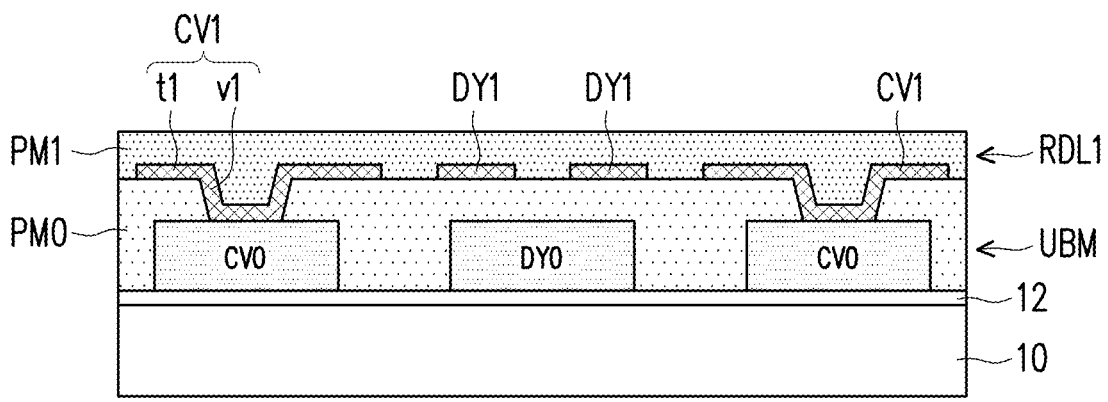
Figure 25D:
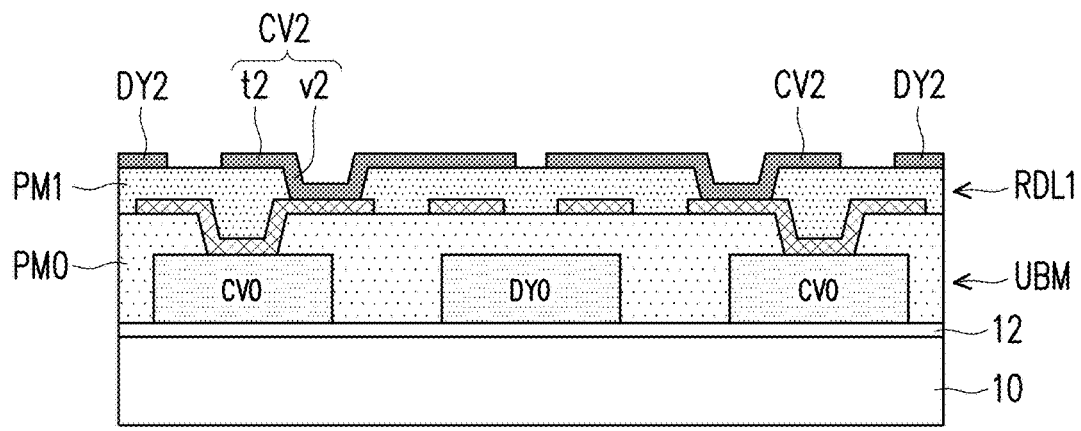
Figure 25E:
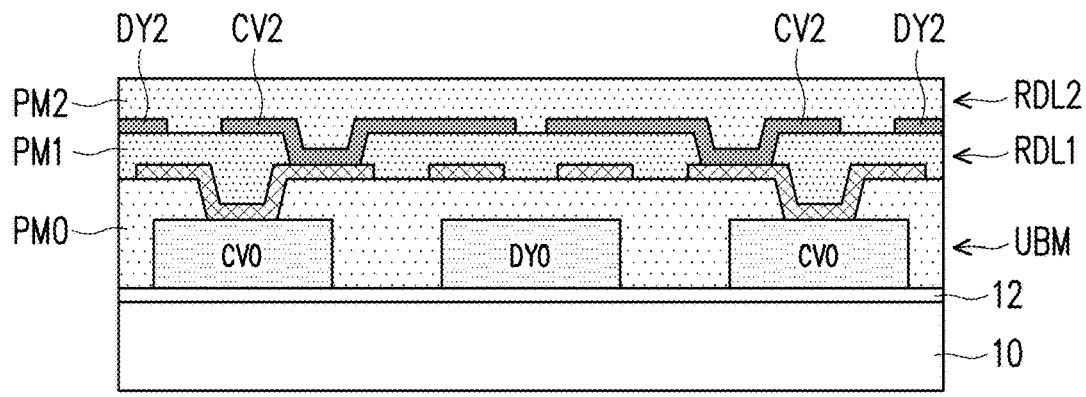
Figure 25F:
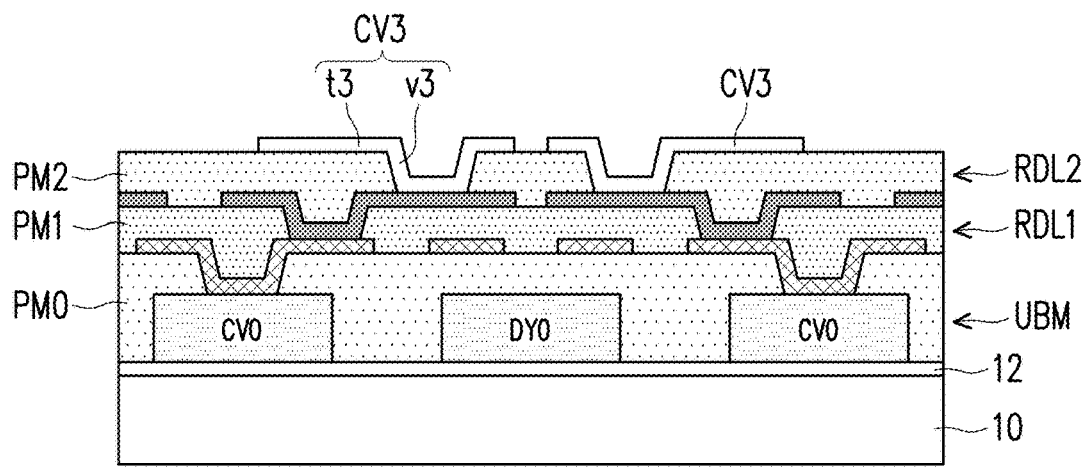
Figure 25G:
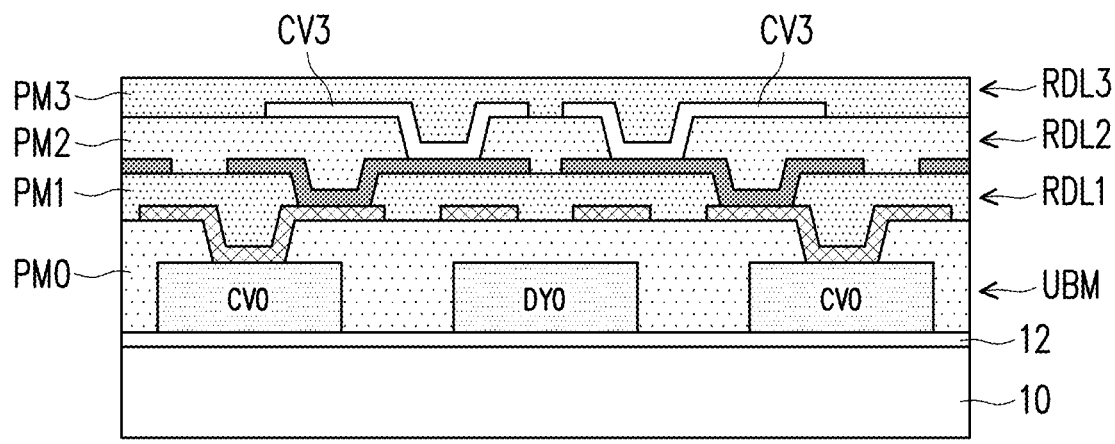

Please refer to FIGS. 25B and 25C. The non-planarized dielectric layer PM0 is patterned to define a via opening (not shown). Then, conductive structures CV1 and dummy structures DY1 are formed on the dielectric layer PM0 and in the via opening, and then a dielectric layer PM1 is formed. The conductive structures CV1, the dummy structures DY1, and the dielectric layer PM1 form a redistribution layer RDL1. The conductive structures CV1 include a trace t1 and a via v1. The trace t1 of the conductive structures CV1 is electrically connected to the conductive structures CV0 via the via v1. The dummy structures DY1 are disposed around the conductive structures CV1. The dummy structures DY1 are floating, electrically insulated from the conductive structures CV1 and CV0, and electrically insulated from the dummy structure DY0. The conductive structures CV1 and the dummy structure DY1 may be formed according to steps S52 to S56 of FIG. 24. The dielectric layer PM1 is formed after the conductive structures CV1 and the dummy structures DY1 are formed to cover the conductive structures CV1 and the dummy structures DY1.

Referring to FIGS. 25D to 25G, redistribution layers RDL2 and RDL3 are formed according to the method of the redistribution layer RDL1. The redistribution layer RDL2 includes conductive structures CV2 and dummy structures DY2 not electrically connected to each other, and a dielectric layer PM2. The conductive structures CV2 include a trace t2 and a via v2. The trace t2 of the conductive structures CV2 is electrically connected to the conductive structures CV1 via the via v2. The dummy structures DY2 are disposed around the conductive structures CV2. The dummy structures DY2 are floating and electrically insulated from the conductive structures CV2 and CV1. The dielectric layer PM2 covers the conductive structures CV2 and the dummy structures DY2. The redistribution layer RDL3 includes conductive structures CV3 and a dielectric layer PM3. The conductive structures CV3 include a trace t3 and a via v3. The trace t3 of the conductive structures CV3 is electrically connected to the conductive structures CV2 via the via v3. The dielectric layer PM3 covers the conductive structures CV3.

Figure 25H:
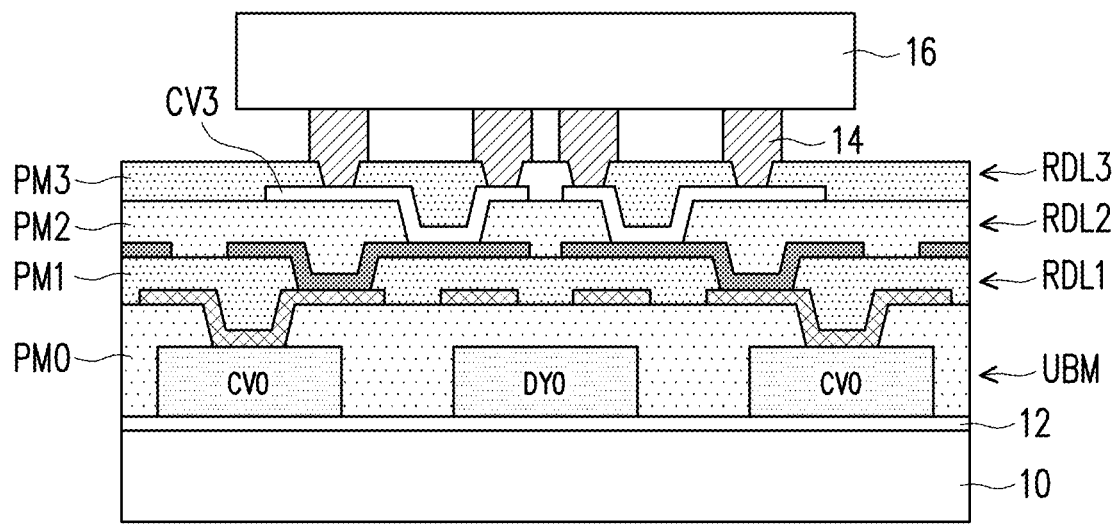

Please refer to FIG. 25H, the non-planarized dielectric layer PM3 is patterned to define the location of via openings. Then, connecting ends 14 are formed on the dielectric layer PM0 and in the via openings. Then, the connecting ends 14 are joined with a die 16.

In the present embodiment, the degree of planarization DOP0 of the under-bump metal layer structure UBM, the degree of planarization DOP1 of the redistribution layer RDL1, and the degree of planarization DOP2 of the redistribution layer RDL2 may reach 95% or more. Therefore, the conductive structures CV3 of the redistribution layer RDL3 may be formed on the redistribution layer RDL2 having high degree of planarization.

Simulation Example 1

Figure 26:
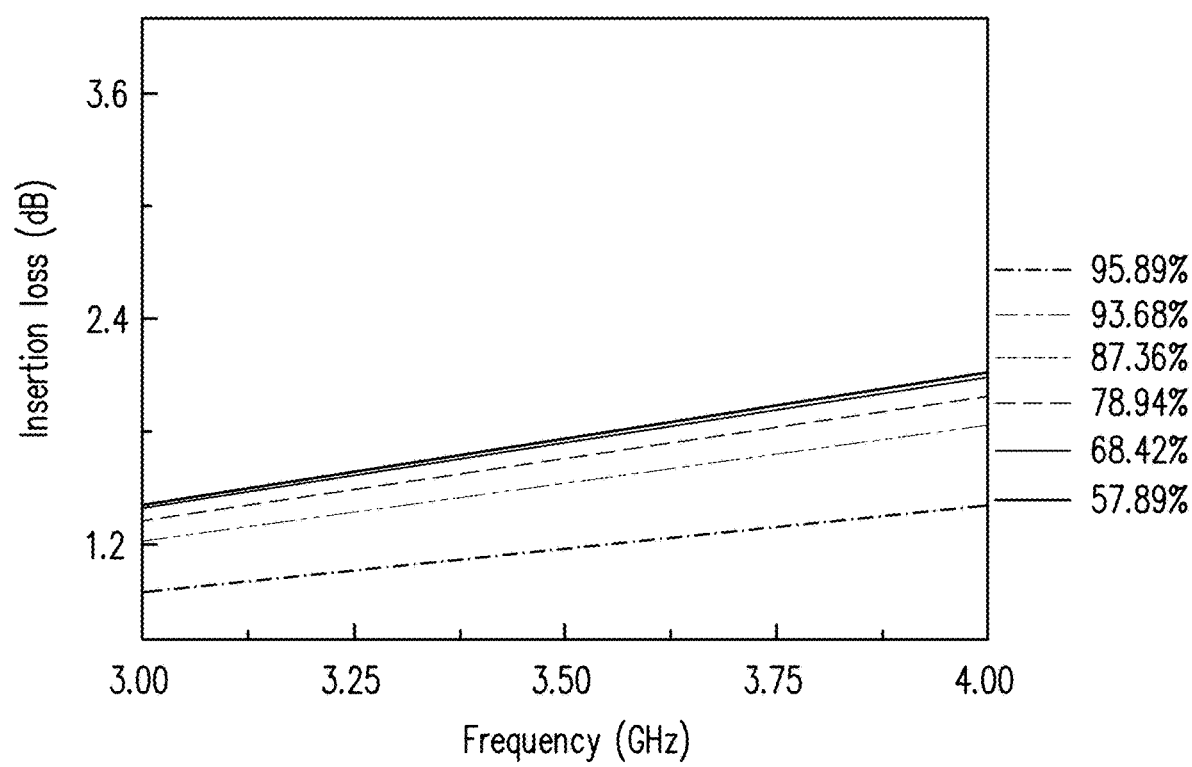
FIG. 26 is a diagram showing the relationship between degree of planarization and insertion loss of a redistribution layer according to an embodiment of the disclosure.

The effect of the degree of planarization DOP of the various redistribution layers RDL on the electrical properties of the upper trace was simulated, and the results are shown in FIG. 26. The results according to FIG. 26 show that as DOP is reduced, insertion loss is increased significantly. When DOP is greater than 95%, electrical loss may be reduced to within the design requirements.

Simulation Example 2

Square or strip-shaped copper conductive structures with a thickness of 10 μm and a width L were used as the dummy structures of the redistribution layer RDL, and the dummy structures were respectively arranged in an array with a gap width S of 1 and 2 times the width L. Then, a PSPI dielectric layer with a thickness of 1.1 to 1.6 times the thickness of the conductive structures was coated to simulate the degree of planarization DOP of the redistribution layer RDL. The results are shown in Table 1.

TABLE 1

| | Shape of dummy structure | | | |
|---|---|---|---|---|
| | Square | | Strip | |
| L/S | 1:1 | 1:2 | 1:1 | 1:2 |
| 10 μm | 96.3% | 87.4% | 95.8% | 81.3% |
| 20 μm | 83.3% | 79.9% | 76.7% | 60.9% |
| 40 μm | 57.3% | 54.6% | 55.6% | 51.3% |
| 100 μm | 53.2% | 53.1% | 53.1% | 48.4% |

Simulation Comparative Example 1

A PSPI dielectric layer with a thickness of 1.1 to 1.6 times the thickness of the conductive structures was coated on a single copper conductive structure with different widths to simulate the degree of planarization DOP of the redistribution layer RDL. The results are shown in Table 2.

TABLE 2

| CD (μm) | 10 | 15 | 20 | 25 | 30 | 35 | 40 | 100 | 300 |
|---|---|---|---|---|---|---|---|---|---|
| T (μm) | 10.78 | 10.81 | 10.8 | 10.7 | 10.5 | 10.34 | 10.39 | 10.06 | 9.69 |
| h (μm) | 1.9 | 3.25 | 3.92 | 4.24 | 4.29 | 4.41 | 4.42 | 5.67 | 7.73 |
| DOP (%) | 82.3 | 69.9 | 63.7 | 60.3 | 59.1 | 57.4 | 57.5 | 43.6 | 20.2 |

The results in Tables 1 and 2 show that the smaller the width of the copper conductive structures, the larger the degree of planarization DOP. However, the degree of planarization DOP of copper pads with a width of 10 μm still could not reach 95%. The degree of planarization DOP of the redistribution layer RDL having a plurality of dummy structure configurations is greater than the degree of planarization DOP of the redistribution layer RDL having only a single dummy structure. The degree of planarization DOP of the redistribution layer RDL with the ratio of 1:1 of the width L to the gap width S of the dummy structures is greater than the degree of planarization DOP of the redistribution layer RDL with a ratio of 1:2 of the width L of the dummy structures to the gap width S. In addition, the degree of planarization DOP of the redistribution layer RDL having square dummy structures is slightly larger than the degree of planarization DOP of the redistribution layer RDL having rectangular dummy structures.

Simulation Example 3

Square copper conductive structures with different widths L were used as dummy structures and arranged in an array with different gap widths S. Then, a PSPI dielectric layer with a thickness of 1.1 to 1.6 times the thickness of the conductive structures was coated to simulate the degree of planarization DOP of the redistribution layer RDL. The results are shown in Table 3.

planarization DOP may reach 95.9%. For dummy structures with a width of 20 microns, the ratio L/S is controlled at 1, and the degree of planarization DOP may reach 83.3%. For dummy structures with a width of 40 microns, the ratio L/S is controlled at 1, and the degree of planarization DOP is only 59.8%. In other words, the degree of planarization DOP obtained by the dummy structures with a small width is greater than the degree of planarization DOP obtained by the dummy structures with a large width. Dummy structures with a small width and a small ratio L/S may obtain a relatively large degree of planarization DOP, and dummy structures with a large width need to have a larger ratio L/S to obtain the same degree of planarization DOP.

Simulation Example 4

Copper with different thicknesses and different widths L was used as the conductive structures of the RDL, and dummy structures were disposed around the conductive structures with different gap widths S, and then a PSPI dielectric layer with a thickness of 1.1 to 1.6 times the thickness of the conductive structures was coated. The ratio L/S of the width L of the conductive structures to the gap width S needed for a degree of planarization DOP of 95% and the ratio range of the width L of the conductive structures to the width D of the dummy structures were simulated, and the results are shown in Table 4.

TABLE 3

| | L/S | | | | | | | | |
|---|---|---|---|---|---|---|---|---|---|
| CD (μm) | 10/5 | 10/10 | 10/15 | 10/20 | 20/5 | 20/10 | 20/15 | 20/20 | 20/40 |
| T (μm) | 10.12 | 9.83 | 10.71 | 10.04 | 9.02 | 9.46 | 10.21 | 10.28 | 10.12 |
| h (μm) | 0.0057 | 0.398 | 1.05 | 1.31 | 0.161 | 0.85 | 1.65 | 1.71 | 2.03 |
| Degree of planarization DOP (%) | 99.4 | 95.9 | 90.2 | 86.9 | 98.2 | 91 | 83.8 | 83.3 | 79.9 |

| | L/S | | | | | | | |
|---|---|---|---|---|---|---|---|---|
| CD (μm) | 40/5 | 40/10 | 40/20 | 40/25 | 40/30 | 40/35 | 40/40 | 40/80 |
| T (μm) | 7.2 | 7.68 | 8.23 | 8.25 | 8.38 | 8.71 | 9.16 | 8.93 |
| h (μm) | 0.235 | 0.891 | 2.15 | 2.34 | 2.45 | 2.88 | 3.68 | 3.72 |
| Degree of planarization DOP (%) | 96.7 | 88.4 | 73.8 | 71.6 | 70.7 | 66.9 | 59.8 | 58.3 |

The results in Table 3 show that when the width of the dummy structures is the same, the smaller the width of the gap, the higher the density of the dummy structures and the greater the degree of planarization DOP. For example, in an example in which the width of the dummy structures is 10 microns, the width of the gap is changed from 20 microns to 5 microns, and the degree of planarization DOP rises from 86.9% to 99.4%.

Furthermore, for dummy structures with a width of 10 microns, the ratio L/S is controlled at 1, and the degree of

TABLE 4

| Copper wire thickness | Conductive structure CD (L) | L/S | L/D |
|---|---|---|---|
| >8 μm | ≤10 μm | ≥1/1 | 1/1 |
| | 10 μm to 20 μm | ≥3/1 | 1/1 to 2/1 |
| | 20 μm to 100 μm | ≥8/1 | 1/1 to 5/1 |
| | >100 μm | ≥12/1 | 1/1 to 10/1 |
| 4 μm to 8 μm | ≤10 μm | ≥3/2 | 1/1 |

TABLE 4-continued

| Copper wire thickness | Conductive structure CD (L) | L/S | L/D |
|---|---|---|---|
| | 10 μm to 20 μm | ≥2/1 | 1/1 to 2/1 |
| | 20 μm to 100 μm | ≥5/1 | 1/1 to 5/1 |
| | >100 μm | ≥10/1 | 1/1 to 10/1 |
| 1 μm to 4 μm | ≤10 μm | ≥1/2 | 1/1 |
| | 10 μm to 20 μm | ≥1/1 | 1/1 to 2/1 |
| | 20 μm to 100 μm | ≥4/1 | 1/1 to 5/1 |
| | >100 μm | ≥8/1 | 1/1 to 10/1 |

The results of Table 4 show that for conductive structures with a thickness of 1 micron to 8 microns, or even greater than 8 microns, if the ratio of the width L of the conductive structures to the gap width S is controlled to be greater than 1/2, the degree of planarization DOP may reach 95%.

Moreover, for conductive structures with a width greater than 100 microns, the ratio L/S of conductive structures with a thickness of 1 micron to 4 microns is controlled to be greater than or equal to 8, so that the degree of planarization DOP of the redistribution layer RDL may reach 95%; and the ratio L/S of conductive structures with a thickness greater than or equal to 8 microns needs to be controlled at greater than or equal to 12, so that the degree of planarization DOP of the redistribution layer RDL may reach 95%. Compared with conductive structures with a small thickness, conductive structures with a large thickness need to have a larger ratio L/S so that the redistribution layer RDL may have the same degree of planarization.

In addition, for conductive structures with the same thickness, the larger the width L of the conductive structures, the larger the ratio L/S needs to be so that the degree of planarization DOP may reach 95%. For example, for conductive structures with a thickness of 4 microns to 8 microns and a width L less than 10 microns, a ratio L/S greater than or equal to 3/2 may make the degree of planarization DOP reach 95%; and for conductive structures with the same thickness of 4 microns to 8 microns and a width L greater than 100 microns, the ratio L/S needs to be greater than or equal to 10/1 to achieve a degree of planarization DOP of 95%.

For conductive structures with a thickness of 1 micron to 8 microns, or even greater than 8 microns, if the ratio of the width L of the conductive structures to the width D of the dummy structures is controlled between 1:1 and 10:1, the degree of planarization DOP may reach 95%.

In addition, compared to conductive structures with the same thickness but a smaller width L, the ratio L/D of conductive structures with a larger width L is within a wider interval range, which may make the degree of planarization DOP reach 95%. Compared to conductive structures with the same thickness but a larger width L, the interval range of the ratio L/D of conductive structures with a smaller width L needs be reduced in order to make the degree of planarization DOP reach 95%. In other words, the larger the width L of the conductive structures, the larger the interval range of the ratio L/D at which the degree of planarization DOP reaches 95%.

For example, for conductive structures with a thickness of 4 microns to 8 microns and a width L of greater than 100 microns, controlling the ratio L/D within the interval range of 1/1 to 10/1 may make the degree of planarization DOP reach 95%; and for conductive structures with the same thickness of 4 microns to 8 microns but a width L less than 10 microns, the ratio L/D needs to be controlled at 1 to achieve a degree of planarization DOP of 95%.

Simulation Example 5

Copper with a thickness T1 of 9 μm and a width L1 of 10 μm was used as the conductive structures CV1 of the RDL, and copper with a width D1 of 10 μm was disposed around the conductive structures with a gap width S1 of 10 μm as the dummy structures DY1 of the RDL1. Then, a PSPI dielectric layer PM1 was coated with a thickness of 1.1 to 1.6 times the thickness of the conductive structures CV1 to form the redistribution layer RDL1. Next, a redistribution layer RDL2 was formed on the redistribution layer RDL1. The conductive structures CV2 of RDL2 were copper with a thickness T2 of 5 μm, a width L2 of 5 μm, and a gap width S2 of 3 μm. A dielectric layer PM2 was PSPI with 1.1 to 1.6 times the thickness of the conductive structures CV2. Then, a redistribution layer RDL3 was formed on RDL2. The conductive structures CV3 of RDL3 were copper with a thickness T3 of 2 μm, a width L3 of 2 μm, and a gap width S3 of 2 μm. A dielectric layer PM3 was PSPI with 1.1 to 1.6 times the thickness of the conductive structures CV3.

Simulation Comparative Example 2

RDL1, RDL2, and RDL3 of Simulation comparative example 2 were similar to RDL1, RDL2, and RDL3 of Simulation example 5, but RDL1 did not include the dummy structures DY1.

The results show that in Simulation comparative example 2, the degree of planarization of the redistribution layer RDL1 without the dummy structures DY1 was 60%. In Simulation example 5, the degree of planarization of the redistribution layer RDL1 including the dummy structures DY1 could reach 95%. This indicates that the configuration of the dummy structures DY1 improved the degree of planarization of the redistribution layer RDL1.

In an embodiment of the disclosure, dummy structures are added around the conductive structures of the redistribution layer, and via the control of the width of the dummy structures and the gap width between the dummy structures and the conductive structures, the degree of planarization of the redistribution layer may be increased to 95%, thereby improving the process yield of the upper conductive structure and reducing the electrical loss of the upper conductive structure.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A redistribution structure, comprising: a first redistribution layer, comprising: a dielectric layer; at least one conductive structure located in the dielectric layer, wherein the at least one conductive structure has a width L; and at least one dummy structure located adjacent to the at least one conductive structure and located in the dielectric layer, wherein the dummy structure has a width D, wherein there is a gap width S between the at least one dummy structure and the at least one conductive structure, and a degree of planarization DOP of the first redistribution layer is greater than or equal to 95%, wherein DOP=[1−(h/T)]*100%; h refers to a difference between a highest height and a lowest height of a top surface of the dielectric layer; and T refers to a thickness of the at least one conductive structure; and wherein the at least one dummy structure comprises a plurality of dummy structures, and a density of the plurality of dummy structures in an area in which the degree of planarization DOP of the first redistribution layer is large is greater than a density of the plurality of dummy structures in an area in which the degree of planarization DOP of the first redistribution layer is small.

2. The redistribution structure of claim 1, wherein a ratio L/S of the width L to the gap width S is 1/2 to 12/1.

3. The redistribution structure of claim 1, wherein a ratio L/S of the width L 20 to the gap width S is 1/2 to 10/1.

4. The redistribution structure of claim 1, wherein a ratio L/D of the width L to the width D of the dummy structure is 1/1 to 10/1.

5. The redistribution structure of claim 1, wherein the at least one dummy structure comprises a plurality of dummy structures, and the width D of the plurality of dummy structures in an area in which the degree of planarization DOP of the first redistribution layer is large is less than the width D of the plurality of dummy structures in an area in which the degree of planarization DOP of the first redistribution layer is small.

6. The redistribution structure of claim 1, further comprising a second redistribution layer, wherein a degree of planarization of the second redistribution layer is less than or equal to the degree of planarization DOP of the first redistribution layer.

7. The redistribution structure of claim 1, wherein the at least one conductive structure comprises a plurality of conductive structures, and the at least one dummy structure is disposed between the plurality of conductive structures.

8. The redistribution structure of claim 1, further comprising an under-bump metal layer structure located below the first redistribution layer, wherein a degree of planarization of the under-bump metal layer structure is less than or equal to the degree of planarization DOP of the first redistribution layer.

9. A forming method of a redistribution structure, comprising: forming a first redistribution layer, comprising: forming at least one conductive structure; forming at least one dummy structure adjacent to the at least one conductive structure according to a thickness T and a width L of the at least one conductive structure; and coating a dielectric layer between and on the at least one conductive structure and the at least one dummy structure, wherein by forming the at least one dummy structure, a degree of planarization DOP of the first redistribution layer is greater than or equal to 95%, wherein DOP=[1−(h/T)]*100%; h refers to a difference between a highest height and a lowest height of a top surface of the dielectric layer; and T refers to the thickness of the at least one conductive structure; and wherein the at least one dummy structure comprises a plurality of dummy structures, and a density of the plurality of dummy structures in an area in which the degree of planarization DOP of the first redistribution layer is large is greater than a density of the plurality of dummy structures in an area in which the degree of planarization DOP of the first redistribution layer is small.

10. The forming method of the redistribution structure of claim 9, wherein there is a gap width S between the at least one dummy structure and the at least one conductive structure, and a ratio L/S of the width L to the gap width S is 1/2 to 12/1.

11. The forming method of the redistribution structure of claim 10, wherein when the width L of the at least one conductive structure is larger, the ratio L/S is larger so that the degree of planarization DOP reaches 95%.

12. The forming method of the redistribution structure of claim 9, wherein a ratio L/D of the width L of the at least one conductive structure to a width D of the at least one dummy structure is 1/1 to 10/1.

13. The forming method of the redistribution structure of claim 12, wherein the larger the width L of the at least one conductive structure, the larger an interval range of the ratio L/D at which the degree of planarization DOP reaches 95%.

14. The forming method of the redistribution structure of claim 9, further comprising: forming a second redistribution layer before forming the first redistribution layer, wherein a degree of planarization of the second redistribution layer is less than or equal to the degree of planarization DOP of the first redistribution layer.

15. The forming method of the redistribution structure of claim 9, further comprising: forming an under-bump metal layer structure before forming the first redistribution layer, wherein a degree of planarization of the under-bump metal layer structure is less than or equal to the degree of planarization DOP of the first redistribution layer.

16. The forming method of the redistribution structure of claim 9, wherein the at least one dummy structure comprises a plurality of dummy structures, and the smaller a width of the plurality of dummy structures, the larger the degree of planarization DOP of the first redistribution layer.

17. The forming method of the redistribution structure of claim 9, wherein the at least one dummy structure comprises a plurality of dummy structures, and the higher a density of the plurality of dummy structures, the larger the degree of planarization DOP of the first redistribution layer.

18. The forming method of the redistribution structure of claim 9, wherein the at least one dummy structure comprises a plurality of dummy structures, and a width of the plurality of dummy structures in an area in which the degree of planarization DOP of the first redistribution layer is large is less than a width of the plurality of dummy structures in an area in which the degree of planarization DOP of the first redistribution layer is small.

* * * * *